US011028680B2

(12) United States Patent
Schipper et al.

(10) Patent No.: US 11,028,680 B2
(45) Date of Patent: *Jun. 8, 2021

(54) FORMING MINERAL IN FRACTURES IN A GEOLOGICAL FORMATION

(71) Applicant: Saudi Arabian Oil Company, Dhahran (SA)

(72) Inventors: Desmond Schipper, Houston, TX (US); Katherine Leigh Hull, Houston, TX (US); Mohammad Hamidul Haque, Katy, TX (US)

(73) Assignee: Saudi Arabian Oil Company, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 16/883,800

(22) Filed: May 26, 2020

(65) Prior Publication Data
US 2020/0340345 A1    Oct. 29, 2020

Related U.S. Application Data

(63) Continuation of application No. 16/397,710, filed on Apr. 29, 2019, now Pat. No. 10,753,190.

(51) Int. Cl.
*E21B 43/267*    (2006.01)
*C09K 8/80*    (2006.01)

(52) U.S. Cl.
CPC .............. *E21B 43/267* (2013.01); *C09K 8/80* (2013.01)

(58) Field of Classification Search
CPC .......... E21B 43/267; C09K 8/80; C21B 13/00
See application file for complete search history.

(56) References Cited

U.S. PATENT DOCUMENTS

| 3,072,502 | A | | 1/1963 | Salvatore |
| 3,284,281 | A | | 11/1966 | Thomas |
| 3,616,855 | A | | 11/1971 | Colgate |
| 3,807,557 | A | | 4/1974 | Miller |
| 3,912,330 | A | | 10/1975 | Carnahan et al. |
| 3,926,575 | A | | 12/1975 | Meyers |
| 3,996,062 | A | | 12/1976 | Frost |
| 4,043,599 | A | | 8/1977 | Lingane |
| 4,043,885 | A | * | 8/1977 | Yen .......................... C25B 3/00 205/696 |
| 4,223,726 | A | | 9/1980 | Cha |
| 4,289,639 | A | | 9/1981 | Buske |

(Continued)

FOREIGN PATENT DOCUMENTS

| CN | 102015959 | 4/2011 |
| CN | 102220116 | 10/2011 |

(Continued)

OTHER PUBLICATIONS

PCT Invitation to Pay Additional Fees and, Where Applicable, Protest Fee issued in International Application No. PCT/US2020/029324 on Jul. 31, 2020, 14 pages.

(Continued)

*Primary Examiner* — Silvana C Runyan
(74) *Attorney, Agent, or Firm* — Fish & Richardson P.C.

(57) ABSTRACT

A system and method for hydraulically fracturing a geological formation with fracturing fluid to generate fractures in the geological formation and forming proppant in situ in the fractures by synthesizing mineral from ions in the fracturing fluid.

37 Claims, 12 Drawing Sheets

(56) References Cited

U.S. PATENT DOCUMENTS

| | | | |
|---|---|---|---|
| 4,324,560 | A | 4/1982 | Fonseca |
| 4,381,950 | A | 5/1983 | Lawson |
| 4,594,170 | A | 6/1986 | Brown et al. |
| 4,640,692 | A | 2/1987 | Audeh |
| 5,224,543 | A | 7/1993 | Watkins |
| 5,232,490 | A | 8/1993 | Bender et al. |
| 6,138,760 | A | 10/2000 | Lopez et al. |
| 6,488,091 | B1 | 12/2002 | Weaver |
| 6,494,263 | B2 | 12/2002 | Todd |
| 6,866,048 | B2 | 3/2005 | Mattox |
| 6,942,840 | B1 | 9/2005 | Broderick |
| 6,989,391 | B2 | 1/2006 | Funkhouser |
| 7,770,647 | B2 | 8/2010 | Watson et al. |
| 8,225,866 | B2 | 7/2012 | Rouffignac et al. |
| 8,851,177 | B2 | 10/2014 | Wigand |
| 8,865,482 | B2 | 10/2014 | Wang et al. |
| 8,936,089 | B2 | 1/2015 | Wigand |
| 9,033,033 | B2 | 5/2015 | Thomas et al. |
| 9,834,721 | B2 | 12/2017 | Chang et al. |
| 9,863,231 | B2 | 1/2018 | Hull et al. |
| 10,329,478 | B2 | 6/2019 | Schnoor et al. |
| 10,351,758 | B2 | 7/2019 | Hull et al. |
| 10,472,555 | B2 | 11/2019 | Hutchins et al. |
| 10,479,927 | B2 | 11/2019 | Hull et al. |
| 10,900,339 | B2 | 1/2021 | Schipper et al. |
| 2004/0101457 | A1 | 5/2004 | Pahlman et al. |
| 2007/0298979 | A1 | 12/2007 | Perry et al. |
| 2008/0070806 | A1* | 3/2008 | Lin .................. C09K 8/74 507/110 |
| 2009/0044945 | A1 | 2/2009 | Wilberg et al. |
| 2009/0143252 | A1 | 6/2009 | Lehmann |
| 2009/0203557 | A1 | 8/2009 | Barnes et al. |
| 2009/0313772 | A1 | 12/2009 | Talley |
| 2010/0010106 | A1 | 1/2010 | Crews |
| 2010/0258265 | A1 | 10/2010 | Karanikas et al. |
| 2010/0276142 | A1* | 11/2010 | Skildum .............. C09K 8/68 166/280.2 |
| 2012/0247774 | A1 | 10/2012 | Li et al. |
| 2013/0056213 | A1 | 3/2013 | Medvedev et al. |
| 2013/0160994 | A1 | 6/2013 | Alsop et al. |
| 2013/0161002 | A1 | 6/2013 | Wigand |
| 2014/0045732 | A1 | 2/2014 | Mazyar |
| 2014/0374104 | A1 | 12/2014 | Kushal |
| 2015/0300140 | A1 | 10/2015 | Eoff et al. |
| 2016/0061017 | A1 | 3/2016 | Nguyen et al. |
| 2016/0289543 | A1 | 10/2016 | Chang et al. |
| 2016/0362965 | A1 | 12/2016 | Parlar |
| 2017/0066959 | A1 | 3/2017 | Hull |
| 2018/0112126 | A1 | 4/2018 | Yang et al. |

FOREIGN PATENT DOCUMENTS

| | | |
|---|---|---|
| CN | 105219948 | 1/2016 |
| WO | WO2004/005435 | 1/2004 |
| WO | WO2013/149122 | 10/2013 |
| WO | WO 2015041669 | 3/2015 |
| WO | WO 2016089813 | 6/2016 |
| WO | WO 2017161157 | 9/2017 |
| WO | WO 2018118024 | 6/2018 |
| WO | WO 2018170065 | 9/2018 |

OTHER PUBLICATIONS

PCT International Search Report and Written Opinion issued in International Appln. No. PCT/US2020/029324, dated Oct. 30, 2020, 21 pages.

PCT Invitation to Pay Additional Fees and, Where Applicable, Protest Fee issued in International Application No. PCT/US2020/030290 on Aug. 7, 2020, 13 pages.

Gulf Cooperation Council Examination Report issued in GCC Application No. GC 2016-31980 dated Sep. 24, 2018, 4 pages.

Gulf Cooperation Council Examination Report issued in GCC Application No. GC 2016-31980 dated Jan. 19, 2019, 4 pages.

Gulf Cooperation Council Examination Report issued in GCC Application No. GC 2017-33918 dated Nov. 17, 2019, 6 pages.

International Search Report and Written Opinion issued in International Application No. PCT/US2016/049958 dated Nov. 23, 2016; 10 pages.

International Search Report and Written Opinion issued in International Application No. PCT/US2017/049866 dated Dec. 1, 2017; 11 pages.

Communication under Rule 71(3) EPC issued in European Application No. 16767088.4 dated Nov. 26, 2019, 50 pages.

Brochard et al., "Fracture Properties of Kerogen and Importance for Organic-Rich Shales," Annual World Conference on Carbon (Carbon 2013), Jul. 2013, 5 pages.

Daneshy, "Hydraulic Fracturing to Improve Production," Tech 101, TheWayAhead, vol. 6, No. 3, Oct. 2010, 4 pages.

Hydraulic Fracturing Fluid Product Component Information Disclosure; 2 pages.

Montgomery, "Chapter 2: Fracturing Fluid Components," Intech open science | open minds, Montgomery, 2013, 21 pages.

Wang et al. Iron Sulfide Scale Dissolvers: How Effective Are They?, SPE 168063, Society of Petroleum Engineers, presented at the SPE Saudi Arabia section Annual Technical Symposium and Exhibition, May 19-22, 2013, 22 pages.

PCT International Search Report and Written Opinion issued in International Appln. No. PCT/US2020/030290 dated Oct. 7, 2020, 20 pages.

Chinese Office Action in Chinese Appln. No. 201780053465.5, dated Dec. 3, 2020, 20 pages, includes English Translation.

* cited by examiner

PYRITE

MACKINAWITE

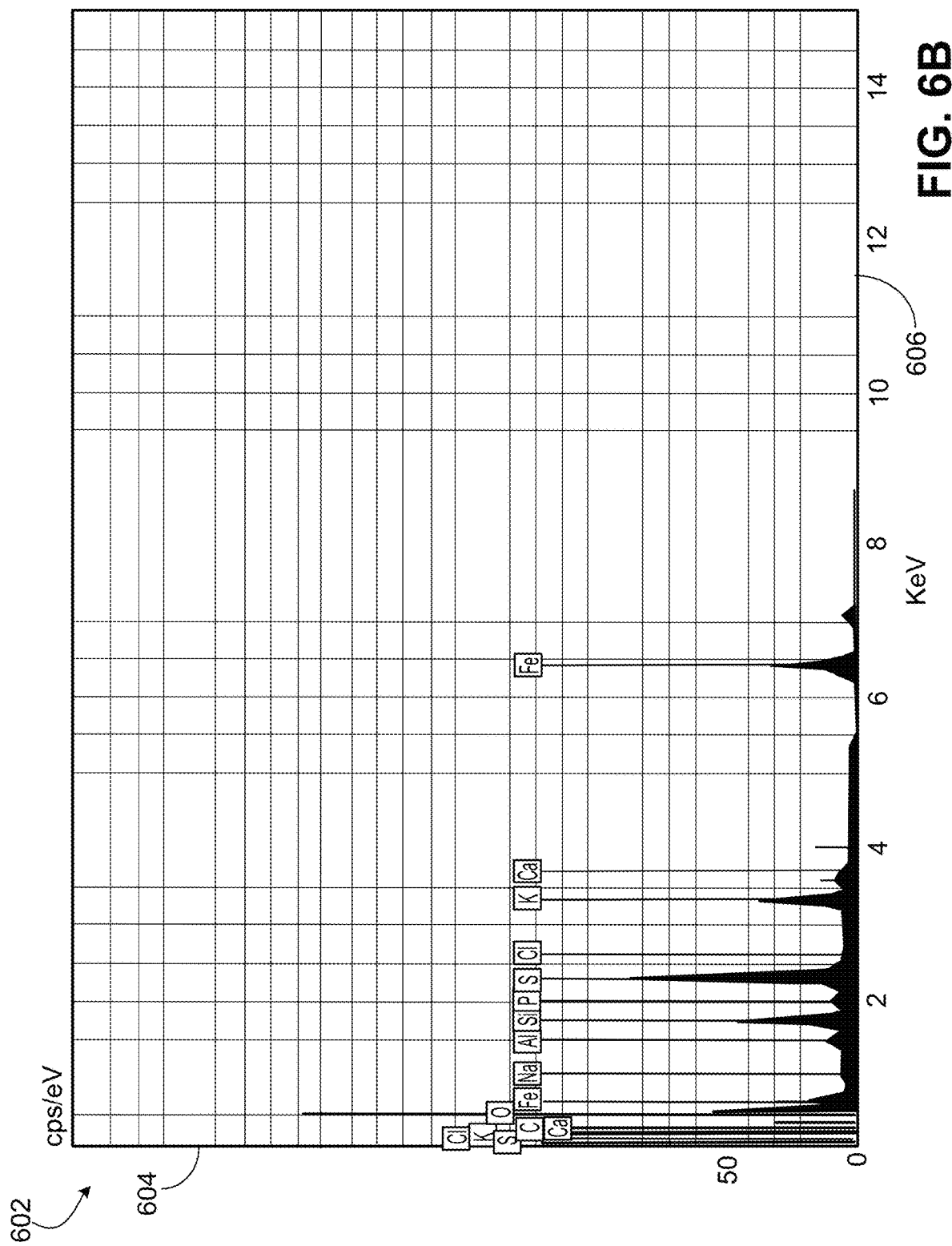

FORMING MINERAL IN FRACTURES IN A GEOLOGICAL FORMATION

CLAIM OF PRIORITY

This application is a Continuation of and claims priority to U.S. patent application Ser. No. 16/397,710, filed on Apr. 29, 2019, the entire contents of which is incorporated herein by reference.

TECHNICAL FIELD

This disclosure relates to fractures in a geological formation.

BACKGROUND

Hydraulic fracturing is generally applied after a borehole is drilled and a wellbore formed. Hydraulic fracturing is a well-stimulation technique in which rock is fractured by a pressurized liquid. Hydraulic fracturing employs fluid and material to generate fractures in a geological formation in order to stimulate production from oil and gas wells. The process can involve the pressurized injection of fracturing fluid into a wellbore to generate cracks in the deep-rock formations through which natural gas, petroleum, and brine will flow more freely. Hydraulic fracturing may increase the flow of oil and gas from a well. The fracturing typically generates paths that increase the rate at which production fluids can be produced from the reservoir formations. The amount of increased production may be related to the amount of fracturing.

Hydraulic fracturing may allow for the recovery of oil and natural gas from formations (for example, shale) that geologists once believed were impossible to produce. Hydraulic fracturing may be employed in tight sandstone, shale, and coal beds to increase crude oil or gas flow to a well from petroleum-bearing rock formations. Hydraulic fracturing can be applied for vertical, horizontal, or deviated wellbores. A beneficial application may be horizontal wellbores in unconventional formations having hydrocarbons such as natural gas and crude oil. Proppants may be employed to maintain the fractures open as pressure depletes in the well.

SUMMARY

An aspect relates to a method of forming proppant in situ in a geological formation, including injecting a frac fluid through a wellbore into the geological formation, and hydraulically fracturing the geological formation with the frac fluid to generate fractures in the geological formation. The method includes forming the proppant in situ in the fractures in the geological formation via the frac fluid and hydrothermal synthesis.

Another aspect relates to a method of forming proppant in situ in a geological formation, including pumping a fracturing fluid through a wellbore into the geological formation, and hydraulically fracturing the geological formation with the fracturing fluid to generate fractures in the geological formation. The method includes precipitating the proppant from the fracturing fluid on rock in the geological formation.

Yet another aspect relates to a method of forming a mineral in a geological formation, including injecting a frac fluid through a wellbore into the geological formation and forming, via the frac fluid, the mineral on rock in the geological formation.

Yet another aspect relates to a method of forming a jarosite group mineral in a geological formation, including pumping a fracturing fluid through a wellbore into the geological formation, and hydraulically fracturing the geological formation with the fracing fluid to generate fractures in the geological formation. The method includes synthesizing the jarosite group mineral from iron ions and sulfate ions in the fracturing fluid via temperature of the geological formation, and precipitating the jarosite group mineral to deposit the jarosite group mineral as a crystallite on faces of the fractures.

Yet another aspect relates to a hydraulic fracturing system including a vessel holding a fracturing fluid and a control component to modulate an addition rate of an additive to the fracturing fluid in the vessel. The system includes a pump (or plurality of pumps) to provide the fracturing fluid from the vessel through a wellbore into a geological formation to hydraulically fracture the geological formation to generate fractures in rock in the geological formation. The system includes a control system to adjust a set point of the control component to change a concentration of the additive in the fracturing fluid in response to a timing of the hydraulic fracturing and to alter a property of a jarosite matrix formed in the fractures via the fracturing fluid.

The details of one or more implementations are set forth in the accompanying drawings and the description to be presented. Other features and advantages will be apparent from the description and drawings, and from the claims.

BRIEF DESCRIPTION OF DRAWINGS

FIG. 6B is a spectrum plot for the jarosite produced in Example 1.

Like reference numbers and designations in the various drawings indicate like elements.

DETAILED DESCRIPTION

Figure 1:
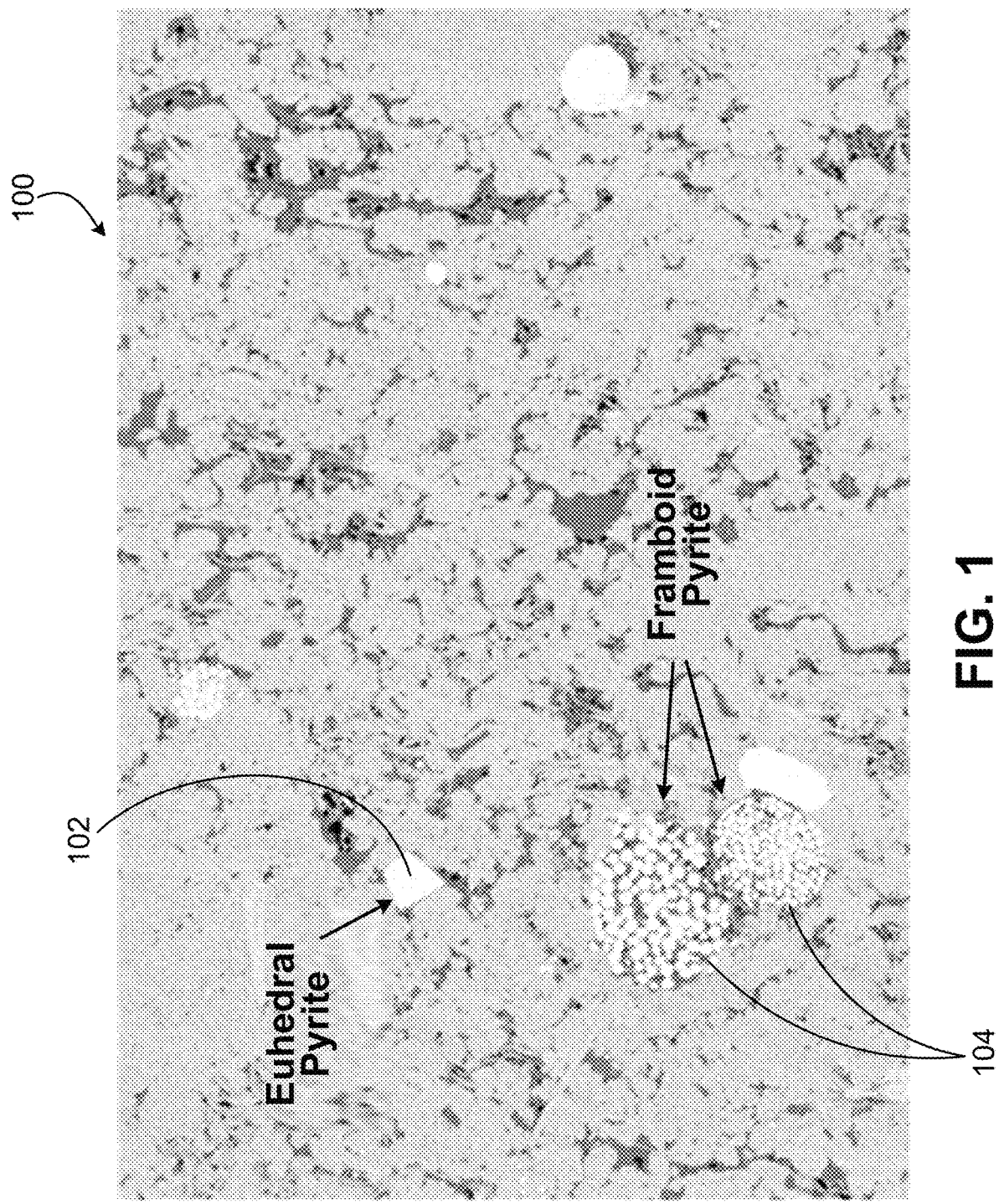
FIG. 1 is an image of a kerogen-rich shale sample containing pyrite minerals that are euhedral or framboidal.

Unconventional reservoirs can include formations containing shale, sandstone, and coal beds. Unconventional formations can have a permeability of less than 1 millidarcy. The hydraulically fracturing of these formations typically forms a complex fracture network of primary fractures and secondary microfractures surrounding the wellbore. The microfractures can extend from a primary fracture outwardly in a branching tree-like manner. These dendritic microfractures can be both near-wellbore and far field. Consequently, the secondary fractures or microfractures can give more depth and breadth to the fracture network. Rock volumes can be near-wellbore (for example, less than 10 feet from wellbore), mid-field (for example, 10 feet to 100 feet from wellbore), and far field (for example, greater than 100 feet from wellbore).

Conventional or traditional proppant particulates (for example, having particle size greater than 150 microns) are typically too large to enter and prop open the microfractures. In the absence of sufficiently small proppant particulates (for example, less than 150 microns), the microfractures tend to close back once the hydraulic pressure placed on the formation is released or decreased. Allowing the microfractures to close eliminates a portion of the fracture network and reduces the production of hydrocarbons.

Present embodiments beneficially grow proppant in fractures including in microfractures and in the far field. Traditional proppant cannot penetrate as deeply. With the present techniques, the pumping of a single-phase carrier fluid and the accessibility of far-field microfractures and nanofractures can be advantageous. Traditional fluid with proppant is multi-phase (slurry) that can suffer with settling of the proppant. Conversely, present embodiments promote transport properties including to reach far field.

The present disclosure relates to in situ-generation of a mineral (for example, jarosite) on rock in a geological formation. The formed mineral may act as a proppant. Some aspects are directed to oxidative treatment of pyrite in a geological formation to form jarosite proppant. Jarosite proppant may be formed in situ in a reservoir or geological formation upon oxidation of pyrite-containing rock or pyrite-containing kerogen. The proppant may thus be formed localized to the fractures and channels including upon removal of kerogen by the aforementioned oxidizer or upon generation of additional fractures by fracturing fluids having the oxidizer. The jarosite proppant may be placed to maintain pore structure without compromise of permeability.

Jarosite may be readily formed upon treatment of pyrite-containing kerogen or rock with oxidizers at elevated temperatures of the geological formation. The oxidizers may be, for example, at least one of bromate or chromate and may be associated with at least one of sulfate or persulfate. Examples to be presented demonstrate pyrite dissolution (giving, for example, $Fe^{3+}$ and $SO_4^{2-}$ ions) and the resulting jarosite formation and precipitation. In certain implementations, the jarosite may be grown in situ by addition of $Fe^{3+}$ and $SO_4^{2-}$ to the fracturing fluid. In particular embodiments, seawater (typically having $SO_4^{2-}$ content) can be utilized to prepare the fracturing fluid.

Embodiments provide for a partial replacement of the pumping of proppants because of the in-situ formation of jarosite proppants. For instance, the amount of pumped proppants may be reduced by 5% to 70% by weight or volume for certain frac jobs. Some jarosite implementations are directed to formation of small-mesh jarosite microproppants having an average particle size, for example, of 100 mesh (150 μm), 200 mesh (75 μm), 400 mesh (35 μm), and 635 mesh (20 μm). These "in-situ grown" or "newly generated" jarosite are not pre-existing in the reservoir nor pumped from surface. This jarosite serves as proppants by keeping the fracture path open for hydrocarbon production. The amount of proppant pumped from surface may be reduced because the jarosite group of minerals formed in-situ serve as proppant. The jarosite group minerals may be formed in-situ by treatment fluid having the oxidizer when the treatment fluid comes across or is exposed to pyrite in the geological formation.

This proppant replacing technology may mitigate issues of "proppant transport" properties. The transport property of proppant is suspension of the proppant within the fracturing treatment fluid without settling due to the proppant weight. Fracture treatment fluid having a lightweight proppant (for example, non-ceramic proppant) has a better transport property than fracture treatment fluid having a ceramic proppant. Fracture treatment fluid not containing proppant particles is even more efficient in transport through the fracture network. The single-phase nature of the fracturing fluid benefits transport. Present implementations eliminate need for transport property promoting proppant flow for the portion of the fracturing job where the traditional proppant is replaced.

The jarosite can be grown in-situ of varying heights and gradually in fracturing applications from larger mesh (jarosite of >150 micrometer (μm) particle size) at near wellbore to smaller mesh (jarosite of <150 μm particle size) in far field. In certain implementations at a start of a frac job, fracturing fluid without oxidizer may be pumped to generate fractures. The pumping of fracturing treatment fluid having oxidizer may be begin (for example, within the first 2 hours, first 3 hours, or first 1-4 hours of the start of the frac job) for the generation of the jarosite matrix as proppants. The adjusting of the timing of injecting the treatment fluid having the oxidizer may be to generate jarosite matrix having a "spatial gradient" that provides a variance of permeability between near wellbore to far field in the fracturing application. There may be inter-grain porosity between the jarosite crystallites. The composition of the treatment fluid may be adjusted in real time to generate jarosite matrix of varying packing density to provide a differing permeability from near wellbore to far field in the fracturing application.

Some embodiments prevent or reduce damage due to proppant embedment. Externally pumped proppant could embed in the reservoir matrix causing reduction in fracture width and hence reduction in hydrocarbon conductivity. The external proppant could embed on the surface of a fracture. Controlled growth of the jarosite layer on a fractured surface may give additional hardness to the fractured surface. The presence of the grown jarosite matrix may prevent or reduce embedment by conventional proppant on the fracture surface (face). As an example, consider a monolayer of 40/70-mesh traditional proppant when not embedded leaving a fracture width 200-400 μm. This fracture width can be reduced when the traditional proppant embeds. A Jarosite layer (for example, 5-20 μm layer) formed on the fractured surface prior to settling of the external proppant may provide a landing surface for the proppant and thus provide for retaining approximately the original 200-400 μm fracture width. The jarosite layer may reduce damage caused by proppant embedment. Furthermore, edges of the jarosite embedding locally can create a network of a matrix plus fractures giving a permeability zone mitigating the permeability reduction cause by embedment of traditional proppant.

Conventional proppants hold open fractures generated in hydraulic fracturing. However, conventional proppants reduce the transport properties of the fracturing fluids and are limited in penetration depth of petroleum reservoirs. The present techniques may beneficially reduce the amount of external proppant utilized in a given fracturing treatment, improve fracturing-fluid transport properties, hold open fractures in far field from the borehole, and reduce cost because of proppant replacement. Embodiments generate proppant (or proppant-like material) in situ through the oxidation of formation pyrite to form jarosite. The geological formation may be hydraulically fractured with fracturing fluid containing an oxidizer that converts pyrite to jarosite as the fracturing fluid permeates the reservoir. Jarosite formed in the fractures generated by the fracturing process may hold the fractures open allowing hydrocarbons to flow during production of the hydrocarbon. Such can decrease the amount of conventional proppant utilized while also promoting hydrocarbon flow from deeper (far field) in the reservoir.

Certain embodiments provide for jarosite group minerals grown in situ in rock formations upon treatment of the rock with an oxidizer and a sulfate source. The sulfate source can be in conjunction with the oxidizer. The sulfate source can be, for example, sulfate or persulfate salts of sodium, potassium, or ammonium. The sulfate source can be sulfur-bearing compounds that can be oxidized to sulfate such as sulfite, pyrosulfate, and thiosulfate. The sulfur source can be sulfuric acid or alkali and alkali earth salts of hydrogen sulfate. The oxidizer can be, for example, alkali and alkali earth salts of bromate or chlorate. The jarosite group minerals formed can be, for example, jarosite, natrojarosite, ammoniojarosite, or hydronium jarosite, or any combinations thereof.

A specific application may treat formation rock bearing pyrite and kerogen with oxidizer. As the oxidizer acts on the kerogen, the oxidizer generally also oxidizes the pyrite in the kerogen to $Fe^{3+}$ and $SO_4^{2-}$. The $Fe^{3+}$ and $SO_4^{2-}$ in turn precipitate as jarosite. After the kerogen has been degraded and removed, jarosite may remain in the voids the kerogen previously occupied. The jarosite may also form at the kerogen-rock interface providing the former kerogen channels with additional jarosite proppant. The jarosite can also deposit on the surface of the rock beyond the kerogen voids. Jarosite may also form where the oxidizing fluid contacts formation pyrite unassociated with kerogen. The jarosite formed is generally stable under the pressures and temperatures of a petroleum reservoir or source rock and thus may be a beneficial proppant substitute. The jarosite or jarosite matrix produced may typically be a porous structure that permits the flow of produced hydrocarbons.

Turning now to the drawings, FIG. 1 is an image of a kerogen-rich shale sample 100 containing pyrite minerals of both euhedral 102 and framboidal 104. Pyrite is an iron sulfide ($FeS_2$) mineral that can be prevalent in unconventional source rock reservoirs (sedimentary rock). The mineral can be present in two different forms: euhedral 102 and framboidal 104. In the euhedral 102 case, the pyrite mineral has defined facets. Framboidal 104 pyrites, by contrast, are clusters of small pyrite crystals. FIG. 1 shows an example of a kerogen-rich shale sample 100 containing both types 102, 104 of pyrite.

Figure 2B:
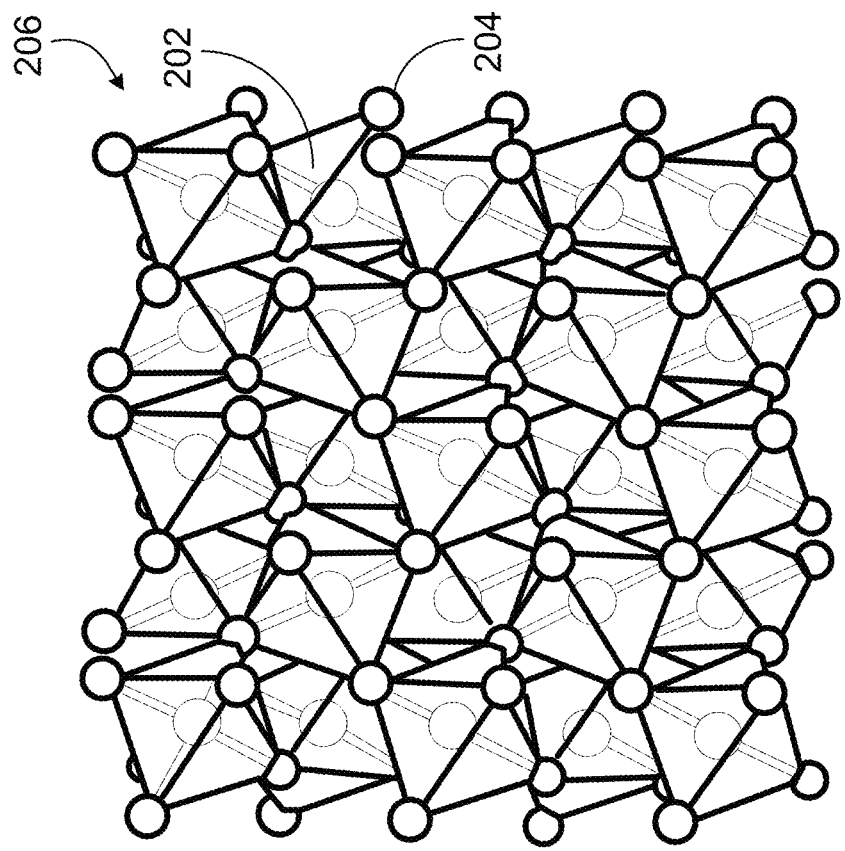
FIG. 2B is a diagram of a crystal structure of the iron-sulfide pyrite
Figure 2A:
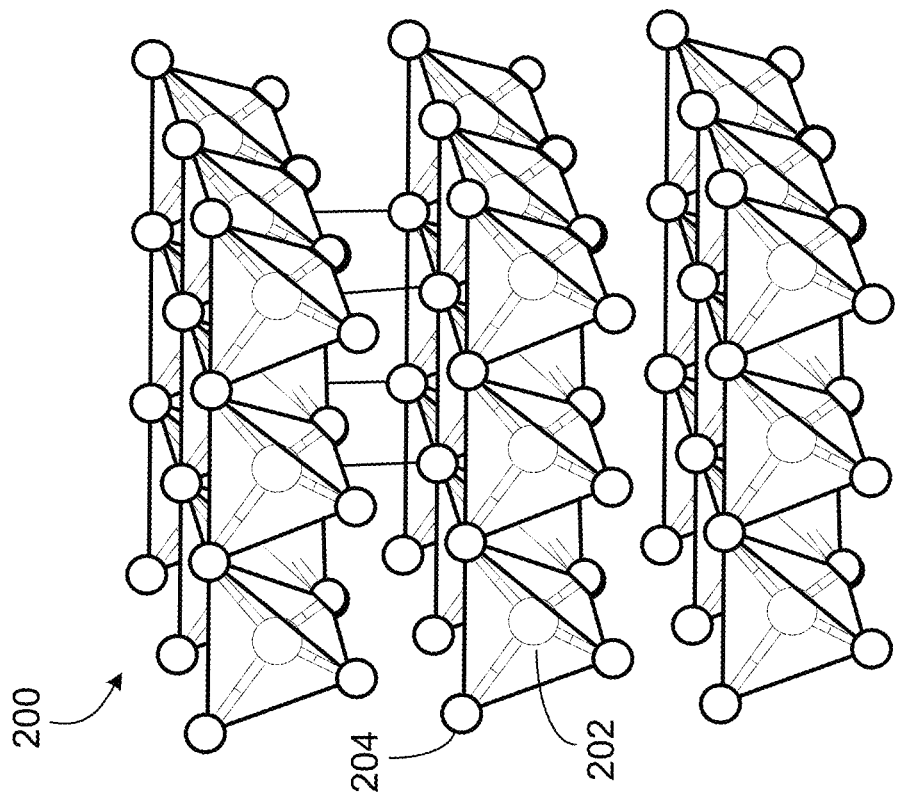
FIG. 2A is a diagram of a crystal structure of the iron-sulfide mackinawite.

FIGS. 2A and 2B illustrate the arrangement of iron 202 and sulfur 204 atoms in mackinawite 200 (FIG. 2A) and pyrite 206 (FIG. 2B), respectively. FIG. 2A is a crystal structure of the iron-sulfide mackinawite 200. FIG. 2B is a crystal structure of the iron-sulfide pyrite 206. The illustration of crystal structures of mackinawite 200 and pyrite 206 depicts 2×2 unit cells with iron 202 and sulfur 204. Pyrite is generally an insoluble mineral. Concentrated acid or base generally cannot dissolve the pyrite. The insolubility of pyrite 206 is related to the structure of the pyrite. The pyrite structure is each iron (Fe) 202 is coordinated to six sulfur (S) 204 atoms in an octahedral arrangement. By contrast, other forms of iron sulfide (for example, marcasite) are soluble in acid. The 1:1 stoichiometry of Fe:S in marcasite differs from the 1:2 stoichiometry of Fe:S in pyrite. Further, iron 202 atoms in the mackinawite 200 structure are tetrahedrally coordinated to sulfur 204 atoms. Whereas mackinawite 200 forms a layered structure, pyrite 206 is composed of a packed lattice. There are forms of iron sulfide other than mackinawite 200 and pyrite 206. Pyrite 206 is the generally the most insoluble and stable structure of iron sulfide. Further, pyrite 206 can be a predominant iron sulfide mineral that is present in hydrocarbon-bearing geological formations.

Because pyrite generally cannot be directly dissolved, a present approach is to oxidize the iron and sulfur of the pyrite to form soluble species. As pyrite is oxidized, $Fe^{2+}$ is converted to $Fe^{3+}$ and sulfide $S_2^{2-}$ is converted to $2SO_4^{2-}$. These generated ions are soluble in aqueous fluid. The elevated temperature of the reservoir provides the hydrothermal conditions for the $Fe^{3+}$ and $SO_4^{2-}$ to react to form jarosite. Jarosite is a basic hydrous sulfate of potassium and iron with a chemical formula of $KFe^{3+}_3(OH)_6(SO_4)_2$. As indicated, this sulfate mineral may be formed by the oxidation of iron sulfides. The mineral group of jarosite consists of $Fe^{3+}$ and $SO_4^{2-}$ but can vary in other aspects of its composition. The composition of jarosite is $KFe_3(OH)_6(SO_4)_2$ but the potassium cation can be substituted with Na (giving natrojarosite), hydronium $H_3O^+$ (giving hydroniumjarosite), or ammonium $NH_4^+$ (giving ammoniojarosite). This mineral group may be characterized as a solid solution series. The potassium can also be substituted with other metal cations such as vanadium, lead, lithium, and antimony.

Figure 3:
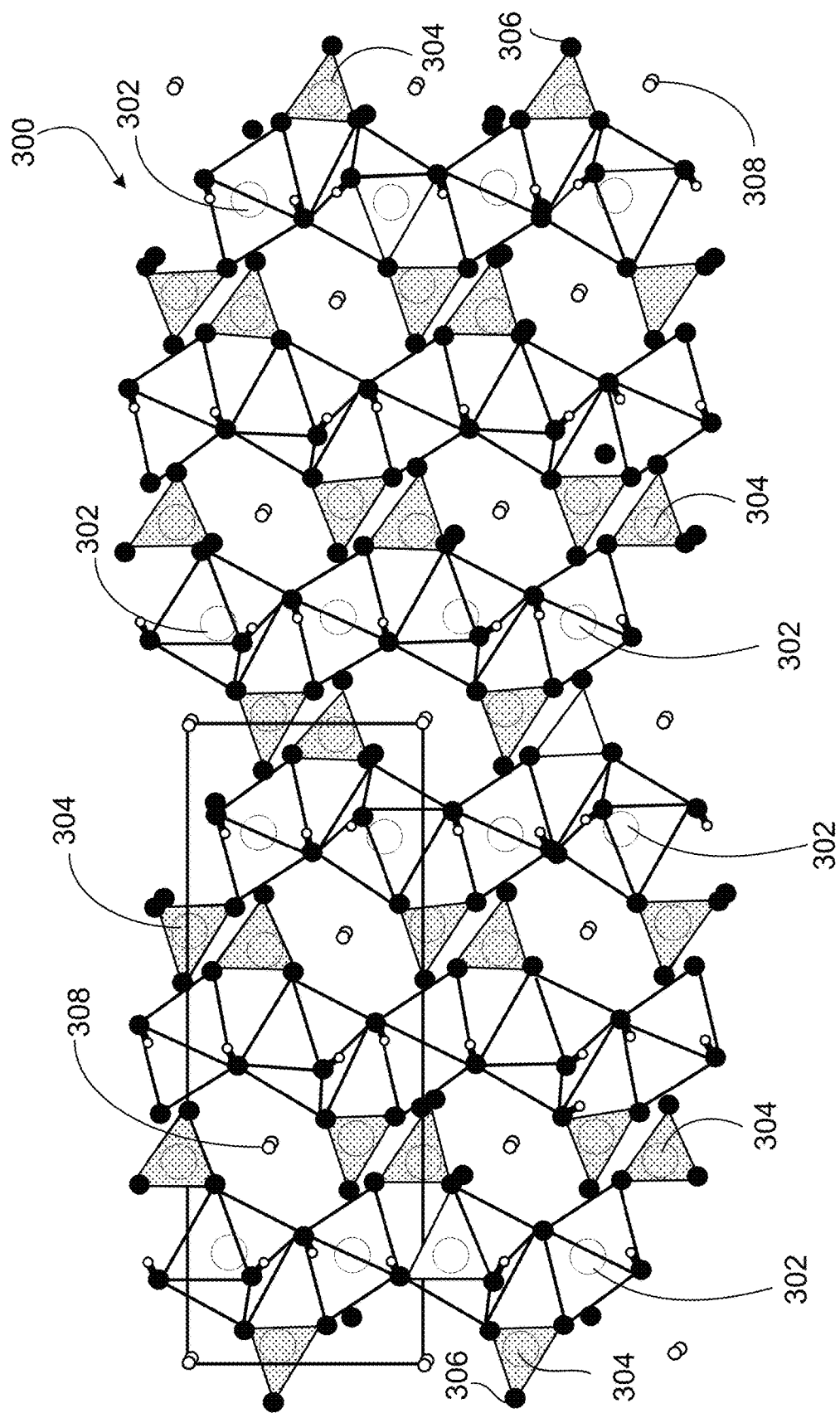
FIG. 3 is a diagram of the general structure of jarosite.

FIG. 3 is a crystal structure of jarosite 300. The depiction shows 2×2 unit cells. The jarosite 300 includes octahedral $Fe^{3+}$ layers and tetrahedral $SO_4^{2-}$ layers. Iron atoms 302 center the octahedral. Sulfur atoms 304 center the tetrahedra. The alternating tetrahedra and octahedra are connected by oxygen atoms 306. Countercations 308 (for example, potassium) fill the interstitial spaces.

Embodiments provide the hydrothermal synthesis of jarosite in the geological formation and the associated or subsequent precipitation of the jarosite on the fracture faces as microproppant and nanoproppant. Embodiments are suited for fracturing fluids containing oxidizer. As the fracturing fluid acts on kerogen and pyrite, the rock may become more prone to fracture. The jarosite proppant can form in the former kerogen-containing rock regions as well as on the fracture surfaces formed in the hydraulic fracturing into which the oxidizer-bearing fracturing fluid intrudes. The jarosite proppant may facilitate hydrocarbons to flow (be produced) from far field within the formation. In certain embodiments with the in-situ formed jarosite, the amount of surface-sourced proppant in the fracturing treatment may be reduced and thus fracturing cost reduced in some implementations.

An embodiment of generating jarosite in the fractures is via performing hydraulic fracturing with a frac fluid (fracturing fluid) containing both $Fe^{3+}$ and $SO_4^{2-}$. The $Fe^{3+}$ and $SO_4^{2-}$ at room temperature are unreactive but at wellbore temperatures react to form jarosite. The pumped frac fluid having both $Fe^{3+}$ and $SO_4^{2-}$ may generate jarosite as a proppant in the microfractures and nanofractures before surface-sourced proppants (for example, sand-based proppants) are added (if needed). The frac fluid may contain $Fe^{2+}$ that is oxidized to $Fe^{3+}$ when an encapsulated oxidizer is released downhole.

Embodiments generate proppant directly in fractures via treatment of a kerogen-containing rock with an oxidizer-containing fracture fluid. In implementations, proppant forms during the oxidation of pyrite contained in the kerogen and the rock. The jarosite proppant forms in the channels formerly occupied by kerogen and in the fractures opened during the "fracking process." Jarosite is stable at typical reservoir pressures and temperatures and permeable to produced hydrocarbon flow from within the reservoir. In a particular embodiment, the forming of the jarosite is completed within two hours. Two hours may be a typical time for a frac job. By adjusting the treatment conditions, jarosite of varying heights and geometries can be grown. The permeability of the jarosite matrix can be similarly tuned to increase or optimize the subsequent produced hydrocarbon flow. The treatment conditions adjusted can include pH, concentration of reagents, sulfur source, and well conditions.

Conventional proppant composed of sand or man-made ceramics is flowed into the fractures generated by the hydraulic fracturing or "fracking" process. The fracture size maintained may be related to the grain size of the sand and how individual grains of sand interact in a channel. Sand-based proppants can generate fines which can decrease permeability. Other surface-supplied proppant may present similar issues. In contrast, present embodiments give the in-situ formation of proppant in microfractures and nanofractures where sand has not traditionally penetrated. This in-situ forming of proppant provides proppant to such fractures and thus may allow hydrocarbon recovery via microfractures generated in the fracturing process. Such may lead to a greater percent of oil recovery from the reservoir.

A related embodiment is fracturing with a fracturing fluid containing $Fe^{3+}$ and $SO_4^{2-}$ in which these ions may be incorporated into the fracturing fluid at the Earth surface. These ionic species generally do not react except at elevated temperatures such as the temperature of the geological formation. Therefore, upon fracking, jarosite may be formed (from these ions) in the resulting fractures with the jarosite serving as a proppant to facilitate hydrocarbon exit from the geological formation. In certain embodiments, the formation of the jarosite from the ions in the fracturing fluid is without oxidation of the rock, kerogen, or pyrite in the geological formation.

Figure 4:
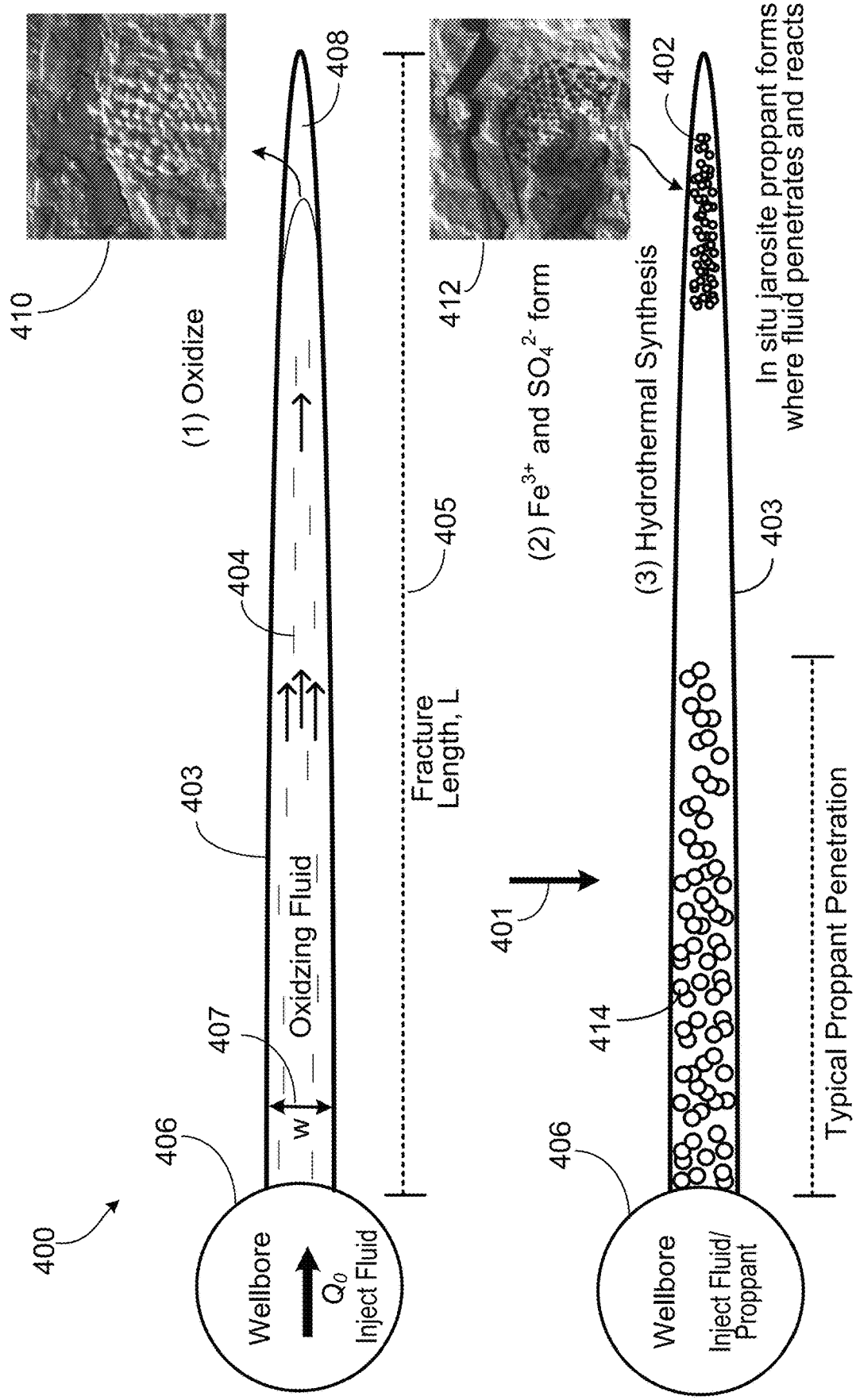
FIG. 4 is sequence diagram of a well in a geological formation.

FIG. 4 is sequence diagram of a well 400 in a geological formation. FIG. 4 illustrates a technique by which the jarosite 402 is formed in the geological formation. The sequence diagram is a schematic demonstrating the generation of jarosite proppant 402 upon pumping a fracturing fluid 404 containing oxidizer into the pyrite-bearing formation. The sequence 401 shows the forming of in-situ jarosite proppant 402 in a hydraulic fracture 403 where oxidizing fracturing fluid 404 penetrates and reacts with the geological formation. The fracture 403 has a length 405 and width 407.

To generate the fracture 403, the fracturing fluid 404 (and any conventional proppant) is injected into the well via a wellbore 406 to hydraulically fracture the geological formation. The wellbore 406 is depicted as a circular cross-section. The fracture 403 is formed propagating out from the wellbore 406. In the illustrated embodiment, the fluid 404 front near the fracture tip 408 comes in contact with pyrite 410 in the formation.

The pyrite 410 (for example, pyrite framboid and including kerogen if present) is oxidized 412 forming the soluble species $Fe^{3+}$ and $SO_4^{2-}$. A threshold concentration of these $Fe^{3+}$ and $SO_4^{2}$ species (for hydrothermal synthesis) is reached in the surrounding aqueous fluid (for example, the oxidizing fracturing fluid 404).

Hydrothermal synthesis occurs to form jarosite that precipitates forming crystallites. The crystallites formed are the in-situ jarosite proppant 402 that may be nanoproppant and microproppant. Thus, the $Fe^{3+}$ and $SO_4^{2-}$ formed from the oxidizing undergoes hydrothermal synthesis at wellbore temperature to form the in-situ jarosite proppant 402. In the illustrated implementation, a surface-sourced proppant 414 may be pumped into the fracture 403 at near wellbore.

Example 1

The Examples presented are given only as examples and not meant to limit the present techniques. In Example 1, shale rock was treated with a solution of 10 milliliters (ml) of 13 millimolar (mM) $NaBrO_3$, 8.7 mM $(NH_4)_2S_2O_8$, and 0.27 molar (M) KCl for 20 hours at 150° C. Jarosite formation was observed on the exposed faces of the shale rock (see FIG. 5).

Figure 5:
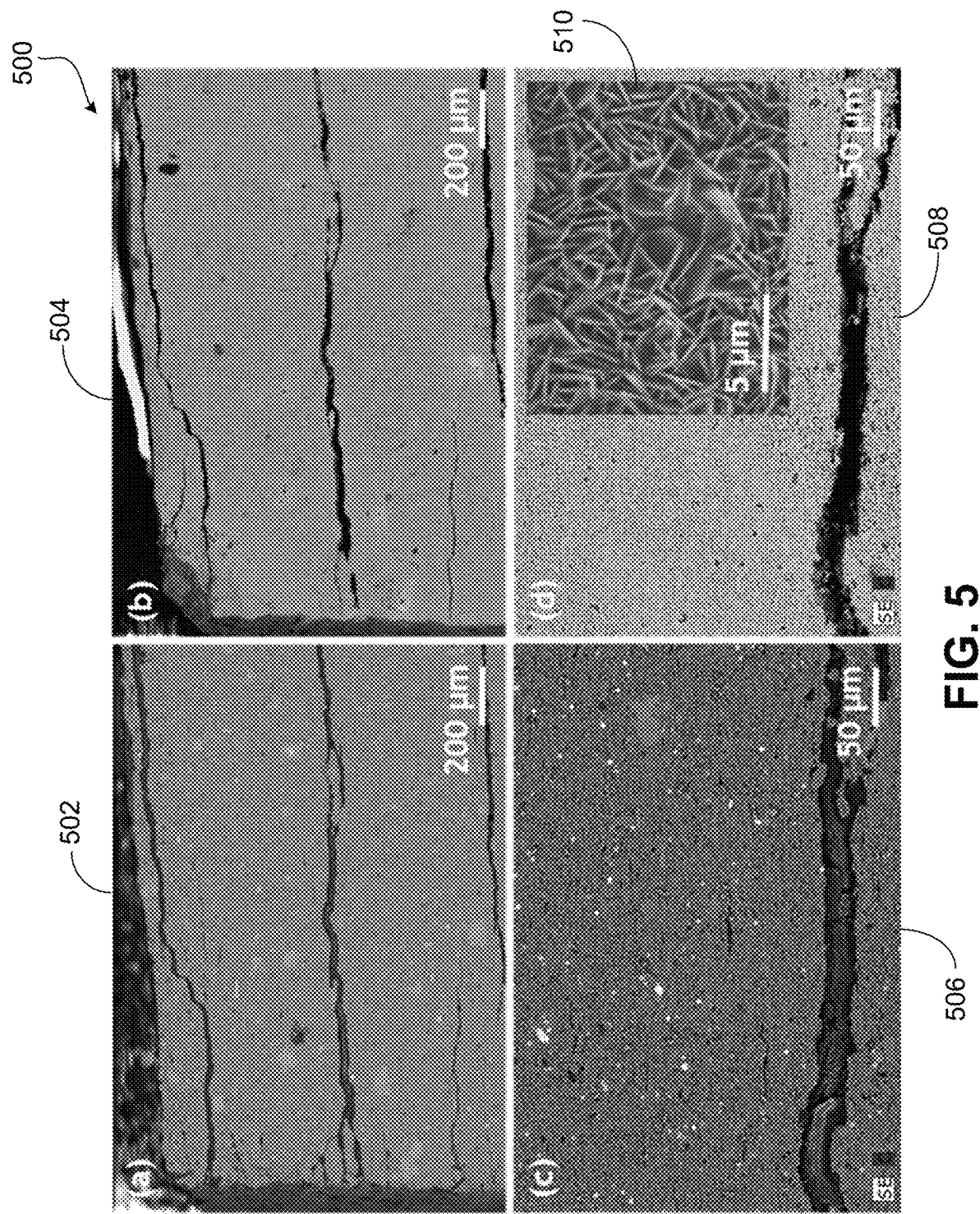
FIG. 5 is images of the shale treated with the oxidizing solution in Example 1.

FIG. 5 is images 500 of the shale treated with the oxidizing solution in Example 1. The images 500 are scanning electron microscope (SEM) images. The image (a) 502 and image (b) 504 are images of the shale rock before the solution was applied. The image (c) 506 and image (d) 508 are images of the shale rock after the solution was applied and thus depict the shale rock as treated. The inset image is a magnified portion depicting jarosite grains 510 in the treated shale rock.

Figure 6A:
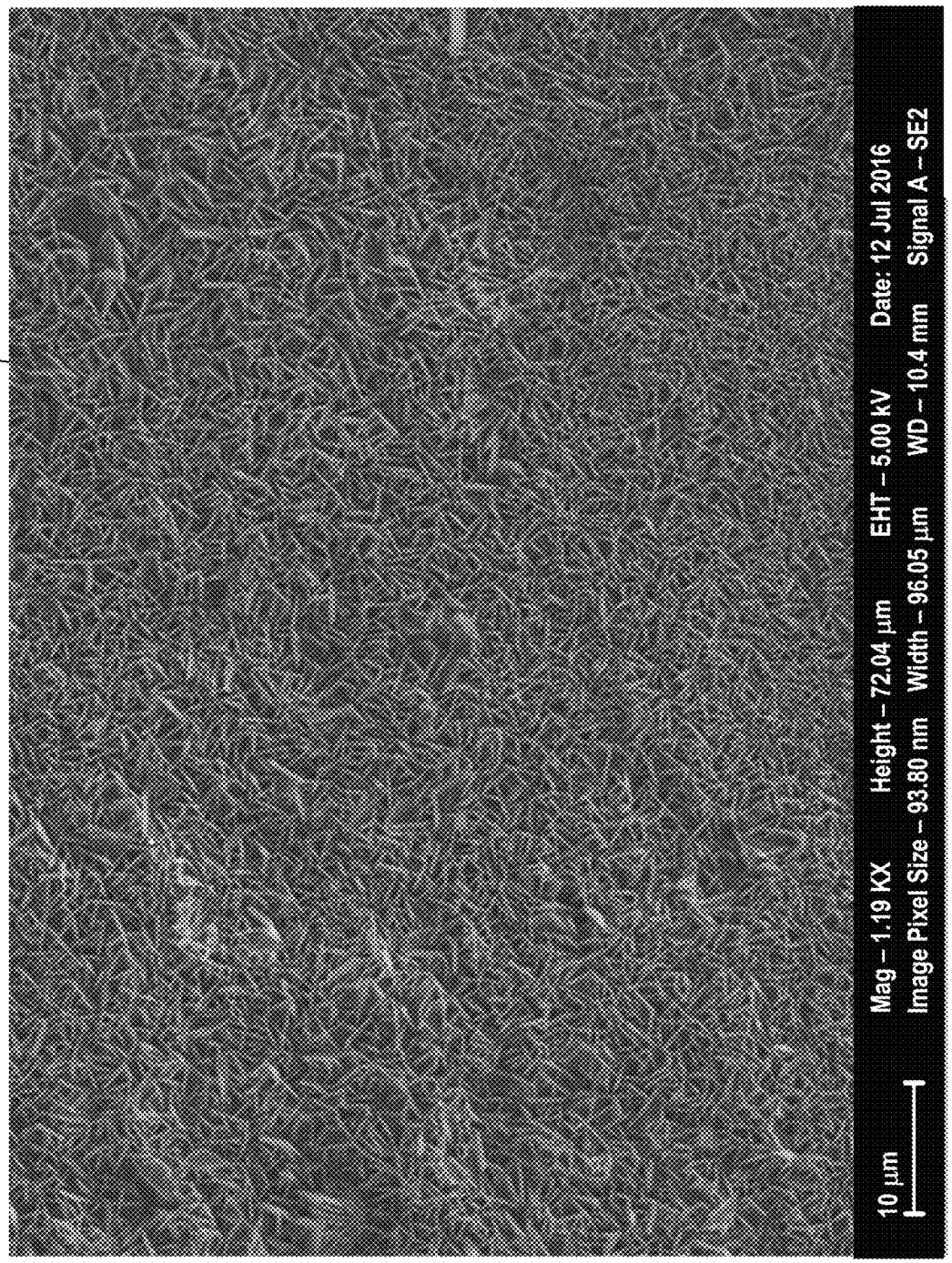
FIG. 6A is an SEM image of the jarosite produced on the shale rock in Example 1.

FIG. 6A is an SEM image 600 of the jarosite 601 produced on the shale rock in Example 1. The image 600 is magnified as compared to images 506, 508 of FIG. 5.

FIG. 6B is the corresponding spectrum 602 for the jarosite 601 produced. The spectrum 602 is by energy dispersive x-ray spectroscopy (EDS) and is in agreement with a jarosite composition. The EDS spectrum 602 is a plot of x-ray counts 604 in counts per second per electron-volt (cps/eV) versus energy 606 in kiloelectron volts (keV).

Example 2

In Example 2, 100 milligrams (mg) of $FeS_2$ (pyrite) were treated with solutions of 0.1M $NaBrO_3$ at various temperatures. Jarosite formed and precipitated as the temperature increased. Table 1 gives the molar (M) concentrations of the soluble species $Fe^{3+}$ and $SO_4^{2-}$ formed in the oxidation as a function of reaction temperature. The last column in Table 1 is the molar ratio of $SO_4^{2-}$ to $Fe^{3+}$.

TABLE 1

| [$Fe^{3+}$] and [$SO_4$]$^{2-}$ as a function of reaction temperature | | | |
|---|---|---|---|
| Temp ° C. | [$Fe^{3+}$] $10^{-4}$ M | [$SO_4^{2-}$] $10^{-4}$ M | [$SO_4^{2-}$]:[$Fe^{3+}$] |
| 20 | 1.2 | 9.8 | 8 |
| 50 | 0.8 | 8.9 | 11 |
| 75 | 0.4 | 9.6 | 26 |
| 100 | 0.8 | 12.5 | 16 |
| 120 | 0.2 | 8.7 | 52 |
| 150 | 0.2 | 10.1 | 52 |

Figure 7A:
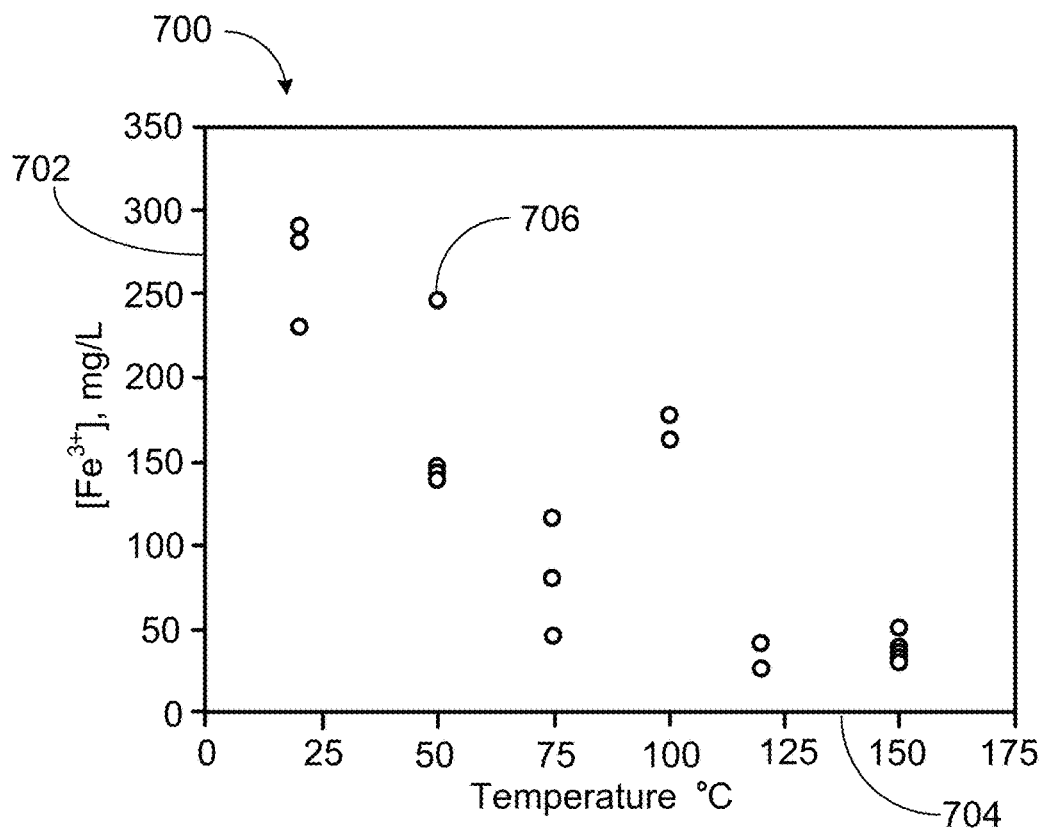
FIG. 7A is a plot of iron concentration versus reaction temperature.

FIG. 7A is a plot 700 of iron concentration 702 (mg per liter or mg/L) versus reaction temperature 704 (° C.). The points 706 are the measured values of iron concentration in the oxidation as a function of reaction temperature.

Figure 7B:
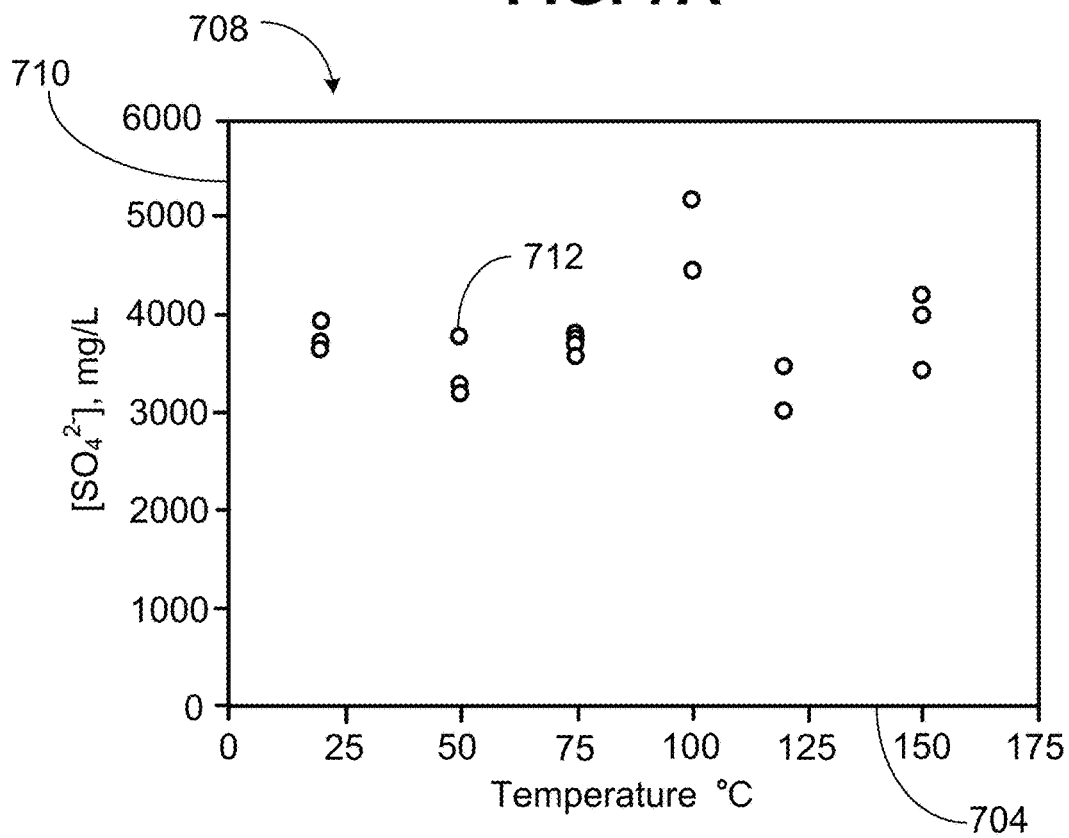
FIG. 7B is a plot of sulfate concentration versus reaction temperature.

FIG. 7B is a plot 708 of sulfate concentration 710 (mg/L) versus reaction temperature 704 (° C.). The points 712 are the measured values of sulfate concentration in the oxidation as a function of reaction temperature.

Thus, FIGS. 7A and 7B give $Fe^{3+}$ concentration and $SO_4^{2-}$ concentration, respectively, as a function of reaction temperature. Jarosite formation is seen by the decrease in iron concentration with increasing temperature in FIG. 7A.

Figure 8A:
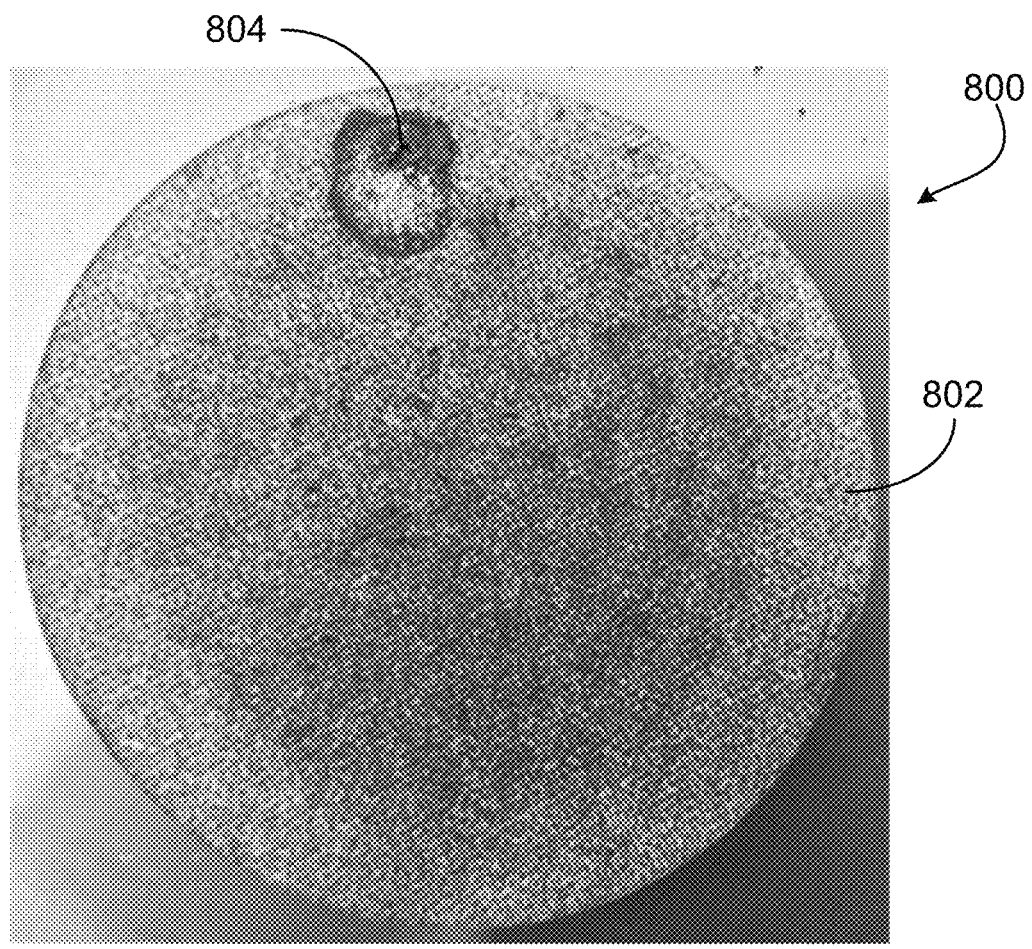
FIG. 8A is an image of the residual solids from the bromate treatment of pyrite in Example 2.

FIG. 8A is an image 800 of the residual solids 802 from the bromate treatment of pyrite in Example 2. The portion 804 has remnants of unreacted pyrite. The residual solids 802 is the resulting precipitate of the oxidation of Example 2 and as associated with the decrease in iron concentration depicted in FIG. 7A, which confirmed Jarosite formation.

Figure 8B:
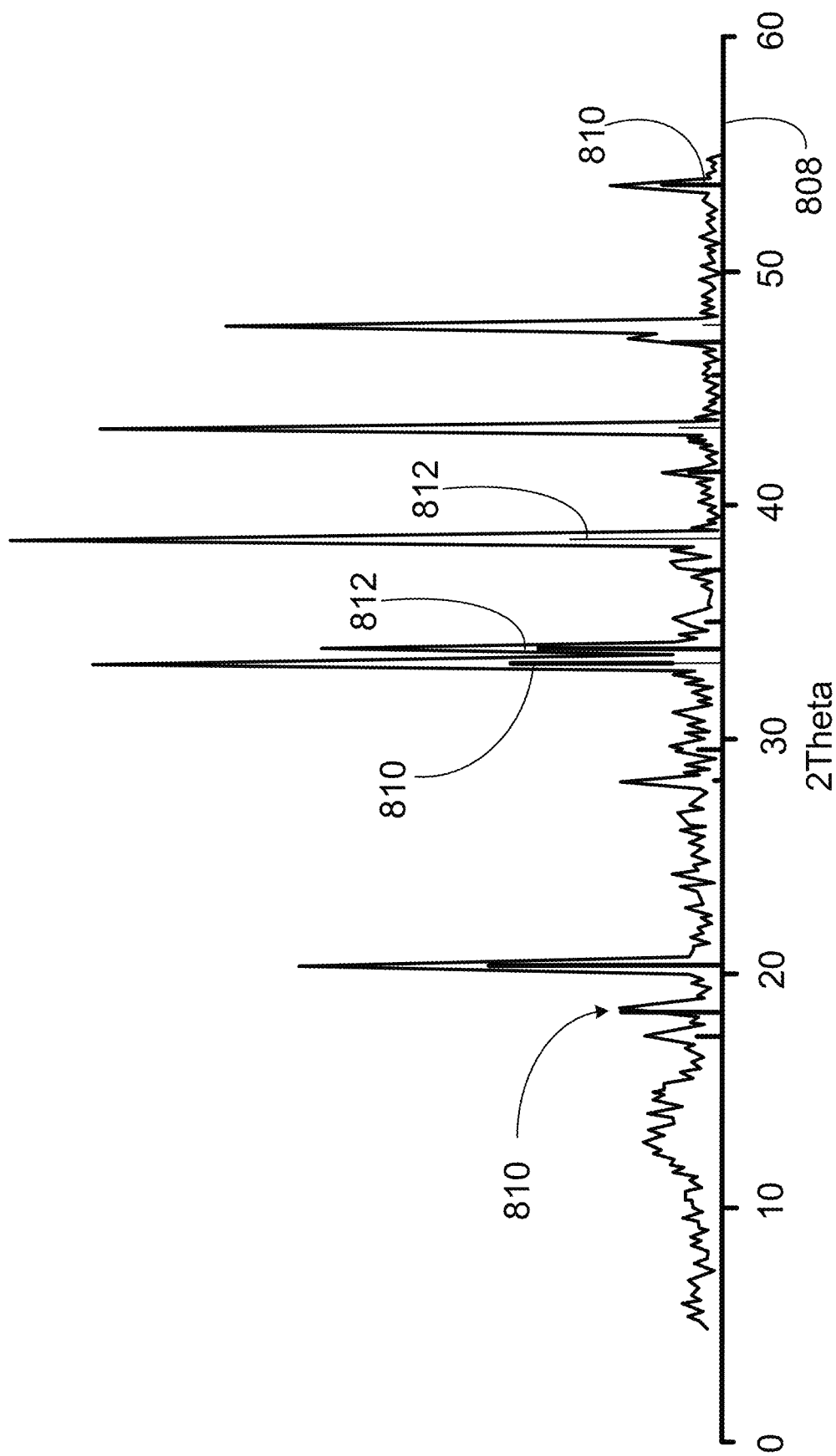
FIG. 8B is a PXRD spectrum plot of the residual solids of FIG. 8A.

FIG. 8B results further confirm the Jarosite formation by powder x-ray diffraction (PXRD) of the resulting precipitate, which shows sodium hydronium jarosite. FIG. 8B is a PXRD spectrum 806 of the residual solids 802. The scattering angle 808 (or diffraction angle) is 2-theta in degrees. The spectrum 806 shows portions 810 that are sodium hydronium jarosite such as $Na_x(H3O)_{1-x}Fe_3(SO_4)_2(OH)_6$. The spectrum 806 shows portions 812 that are pyrite (unreacted).

Typically, resin-coated sand may be employed as the proppant. The size of the sand utilized generally limits permeation into the small fractures. Further, as mentioned, the use of sand is known to generate sand fines which decrease permeability. Present embodiments can replace some of the pumping of proppants including small mesh microproppants (for example, 100 mesh or 150 µm, 200 mesh or 75 µm, 400 mesh or 35 µm, 635 mesh or 20 µm) by having in-situ grown jarosite maintaining fracture paths open for hydrocarbon production.

As discussed, an advantage of this proppant replacing technology may relate to "proppant transport" properties. The transport property of proppant is a property where the proppant is expected to be suspended within the treatment fluid without settling due to weight of the proppant. A lightweight proppant has a better transport property than a heavier proppant. Present embodiments eliminate or reduce the need for the transport property at least for the part of the implementation where the traditional proppant is replaced. Fracture treatment fluid not containing proppant particles can be more efficient in transport through the fracture network. Implementations generate proppants (in the microfractures and nanofractures) where sand generally cannot go. Jarosite formation whether by pyrite oxidation or directed formation (for example, adding $Fe^{3+}$ and $SO_4^{2-}$ to the fracturing fluid) can reduce costs and enhance productivity in fracturing applications.

An additional advantage of a jarosite layer grown on fracture faces may be that of preventing, reducing, or mitigating proppant embedment. Proppant embedment can occur due to the mismatch in mechanical properties of the geological formation and the proppant (for example, harder proppant on a softer surface of the fracture). As discussed, proppant embedment can lead to a reduction in fracture width and hence a reduction in hydrocarbon conductivity. Controlled growth of the jarosite layer may create a hard surface to the matrix that may reduce the possibility of proppant embedment.

The present techniques recognize jarosite as a beneficial material and provide for in-situ generated proppant for fracking purposes. The techniques may generate the proppant from material in the geological formation. Fracturing with an oxidizer-containing fluid to generate proppant in situ is provided.

While the present discussion has focused at times on formation of jarosite mineral from pyrite rock, minerals that are not jarosite may be formed in-situ from the rock (including rock not pyrite) to act as a proppant. For example, the mineral formed in-situ as proppant may include hematite, lepidocrocite, or ferrihydrite, or any combinations thereof. The type of mineral grown (as proppant) from the rock in the geological formation may depend on the rock type. The rock can include siderite, pyrrhotite, chlorite group minerals, chamosite, illite, marcasite, mica, or ankerite, or any combinations thereof. Lastly, the incorporation of an additive including an oxidizer or ions into fluid for in-situ formation of the mineral or proppant can be included in a pumped treatment fluid after fracturing and without hydraulic fracturing occurring during in-situ forming of the mineral or proppant.

Figure 9:
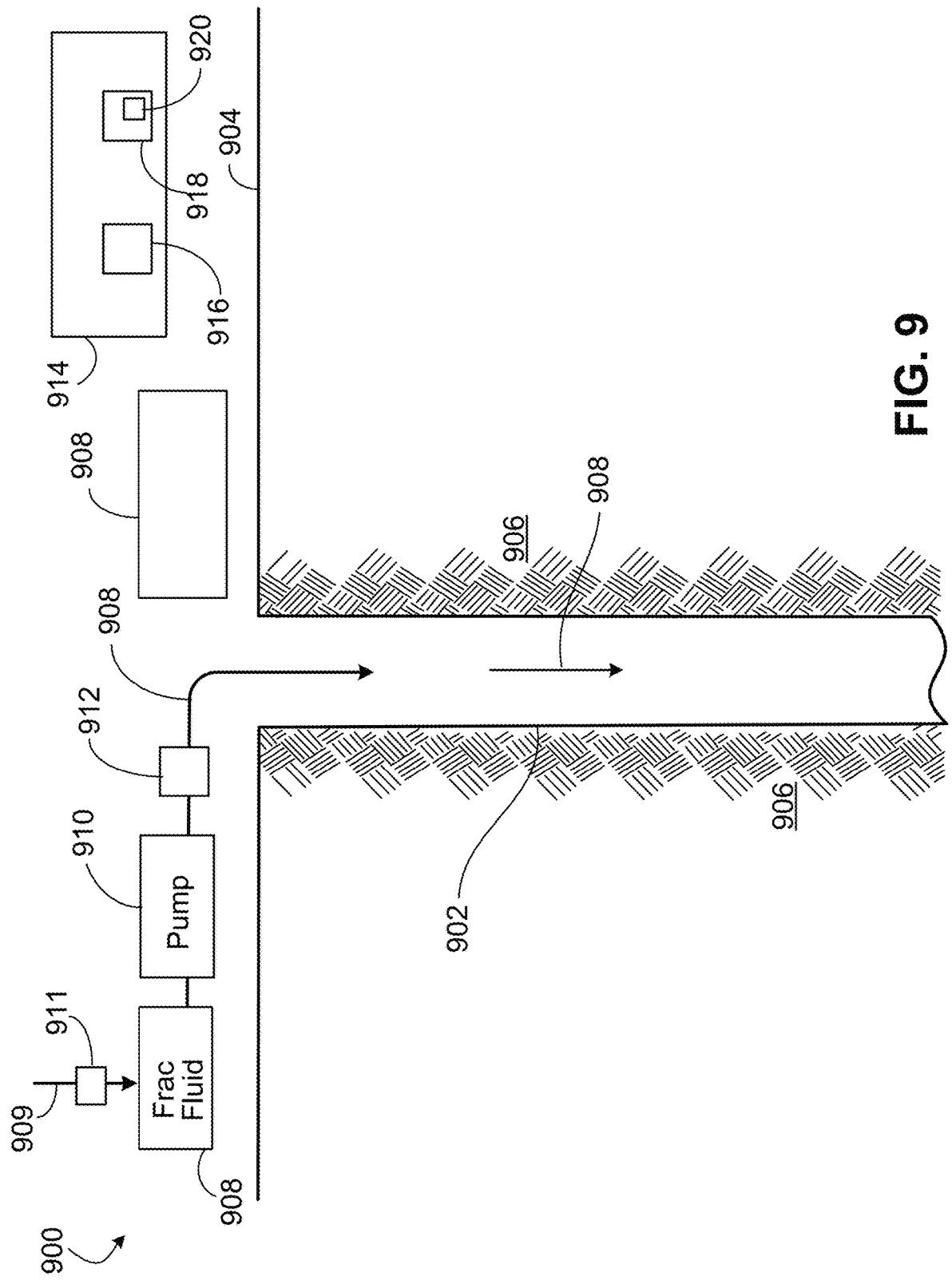
FIG. 9 is a diagram of a well site having a wellbore formed through the Earth surface into a geological formation in the Earth crust.

FIG. 9 is a well site 900 having a wellbore 902 formed through the Earth surface 904 into a geological formation 906 in the Earth crust. The wellbore 902 can be vertical, horizontal, or deviated. The wellbore 902 can be openhole but is generally a cased wellbore. The annulus between the casing and the formation 906 may be cemented. Perforations may be formed through the casing and cement into the formation 906. The perforations may allow both for flow of fracturing fluid into the geological formation 906 and for flow of produced hydrocarbon from the geological formation 906 into the wellbore 902.

The well site 900 may have a hydraulic fracturing system including a source of fracturing fluid 908 at the Earth surface 904 near or adjacent the wellbore 902. The fracturing fluid 908 may also be labeled as frac fluid, fracing fluid, or fracking fluid. The fracturing fluid 908 source may include one or more vessels holding the fracturing fluid 908. The fracturing fluid 908 may be stored in vessels or containers and including on trucks in some implementations. In certain implementations, the fracturing fluid 908 is slick water which may be primarily water (for example, generally at least 98.5% water by volume). The fracturing fluid 908 can also be gel-based fluids. Moreover, the fracturing fluid 908 can be prepared from seawater. In addition, the fracturing fluid 908 can include polymers and surfactants. Other common additives may include hydrochloric acid, friction reducers, emulsion breakers, and emulsifiers.

The hydraulic fracturing system at the well site 900 may include motive devices such as one or more pumps 910 to pump (inject) the fracturing fluid 908 through the wellbore 902 into the geological formation 906. The pumps 910 may be, for example, positive displacement and arranged in series or parallel. Again, the wellbore 902 may be a cemented cased wellbore and have perforations for the fracturing fluid 908 to flow (injected) into the formation 906. In some examples, the speed of the pumps 910 may be controlled to give desired flow rate of the fracturing fluid 908. The system may include a control component 912 to modulate or maintain the flow of fracturing fluid 908 into the wellbore 902 for the hydraulic fracturing and treatment to form jarosite or proppant in situ. The control component 912 may be, for example, a control valve(s). In some implementations, the control component 912 may be the pump(s) 910 as a metering pump in which speed of the pump 910 is controlled to give the specified flow rate of the fluid 908. The set point of the control component 912 may be specified or driven by a control system 914.

In accordance with present embodiments, the fracturing fluid 908 may include an additive 909 to form jarosite or proppant in situ in the geological formation, as discussed earlier. In certain embodiments, the additive 909 is an oxidizer (for example, bromate) and may include a sulfate source (for example, persulfate). In those embodiments, the fracturing fluid 908 having the oxidizer may oxidize pyrite in the geological formation 906, as discussed. In other embodiments, the additive 909 may include iron $Fe^{3+}$ ions and sulfate $SO_4^{2-}$ ions for the treating of rock and generation of jarosite in situ with little or no oxidation downhole. In other words, the jarosite may form (for example, via hydrothermal synthesis) and precipitate in situ from the ions in the fracturing fluid 908 via the conditions (for example, temperature) of the formation 906.

The oxidizing or treating of the pyrite or rock via the additive 909 may grow jarosite in fractures in the geological formation 906. The formed jarosite may act as a proppant, as discussed. The formed proppant may be formed in microfractures and far field into the fractures. The formed jarosite may be formed as a layer (for example, less than 50 µm thickness) on fracture faces to prevent or reduce embedment of traditional proppant. The additive 909 may include bromate, persulfate, $Fe^{3+}$, or $SO_4^{2-}$, or any combinations thereof. In some implementations, the water to prepare the fracturing fluid 908 may be seawater which typically has $SO_4^{2-}$ content.

For the fracturing fluid 908 having the additive 909 including an oxidizer, the oxidizer may include bromate ions $BrO_3^-$ or chlomate ions $ClO_3^-$, or both. For instance, the oxidizer may include an alkali salt of bromate or chlorate (for example, sodium bromate or $NaBrO_3$, potassium bromate or $KBrO_3$, ammonium bromate or $NH_4BrO_3$, sodium chlorate or $NaClO_3$, potassium chlorate or $KClO_3$, ammonium chlorate or $NH_4ClO_3$), or an alkali earth metal salt of bromate or chlorate (for example, magnesium bromate or $Mg(BrO_3)_2$, calcium bromate or $Ca(BrO_3)_2$, barium bromate or $Ba(BrO_3)_2$, magnesium chlorate or $Mg(ClO_3)_2$, calcium chlorate or $Ca(ClO_3)_2$, barium chlorate or $Ba(ClO_3)_2$), or any combinations thereof. Alkali earth metals include beryllium (Be), magnesium (Mg), calcium (Ca), strontium (Sr), barium (Ba), and radium (Ra).

The oxidizer may be utilized with a sulfur source or sulfate source. Thus, the additive 909 may include the sulfur source or sulfate source. Therefore, the fracturing fluid 908 may include the oxidizer and the sulfate source. In some instances, the sulfate source may be characterized as an additional or supplemental oxidizer. The sulfate source may include sulfate ions $SO_4^{2-}$ and persulfate ions $SO_5^{2-}$ or $S_2O_8^{2-}$. The sulfate source may include a sulfate salt (or persulfate salt) of sodium, potassium, or ammonium. For example, the sulfate source may include sodium sulfate ($Na_2SO_4$), sodium persulfate ($Na_2S_2O_8$), potassium sulfate ($K_2SO_4$), potassium persulfate ($K_2S_2O_8$), ammonium sulfate (($NH_4)_2SO_4$), or ammonium persulfate (($NH_4)_2S_2O_8$), or any combinations thereof. The sulfate source can be sulfuric acid or hydrogen sulfate ions $HSO_4^-$, or a combination thereof. The sulfate source may include an alkali salt or alkali earth salt of hydrogen sulfate, such as sodium hydrogen sulfate (sodium bisulfate or $NaHSO_4$), potassium hydrogen sulfate (potassium bisulfate or $KHSO_4$), ammonium hydrogen sulfate (ammonium bisulfate or $(NH_4)HSO_4$), magnesium hydrogen sulfate (magnesium bisulfate or $Mg(HSO_4)_2$), calcium hydrogen sulfate (calcium bisulfate or $Ca(HSO_4)_2$), barium hydrogen sulfate ($Ba(HSO_4)_2$), or any combinations thereof. Alternatively, the sulfate source may include sulfur-bearing compounds that can be oxidized to sulfate such as sulfite, pyrosulfate, thiosulfate, or any combinations thereof.

In operation for certain implementations, the amount of the additive 909 incorporated into the fracturing fluid 908 may be modulated via a control component 911. The control component 911 may be a control valve or metering pump. The amount of additive 909 added to the fracturing fluid 908 may be altered to adjust concentration of the additive 909 in the fracturing fluid 908 to adjust the amount or property (for example, density) of jarosite or jarosite matrix formation in the geological formation 906. The composition of the additive 909 may be changed during the hydraulic fracturing to adjust a property of the jarosite formed. The control component 911 may also provide for starting and stopping addition of the additive 909 to the fracturing fluid 908. In particular implementations, the additive 909 may generally be included in the fracturing fluid 908 during a first portion of the hydraulic fracturing job, such as in the range of the first 1 to 4 hours (for example, first 2 or 3 hours). In certain implementations, the additive 909 is included in the fracturing fluid 908 prior to addition of proppant to the fracturing fluid 908.

The hydraulic fracturing system at the well site 900 may have a source of proppant (for example, sand) which can include railcars, hoppers, containers, or bins having ceramic proppants or sand of differing mesh size (particle size). The source of proppant may be at the Earth surface 904 near or adjacent the wellbore 902. The fracturing fluid 908 may include proppant. In some examples, the proppant may be added (for example, via gravity) to a conduit conveying the fracturing fluid 908 such as at a suction of a fracturing fluid pump 910. The hydraulic fracturing system may include a feeder or blender to receive a proppant and discharge the proppant into a conduit conveying the fracturing fluid 908. Thus, the fracturing fluid 908 may be a slurry that is a combination of the fracturing treating fluid and proppant. For instances when proppant is not added to the fracturing fluid, the fracturing fluid 908 entering the wellbore 902 for the hydraulic fracturing and treating may be the fracturing fluid without proppant. Fracturing fluid of low viscosity (for example, less than 100 centipoise (cP)) or high viscosity (for example, greater than 100 cP) may be employed in the hydraulic fracturing.

The frac rates may include a clean rate that is a flow rate of fracturing fluid 908 without proppant. The frac rates can include a slurry rate that may be a flow rate of the fracturing fluid 908 as slurry of proppant and fracturing fluid. In some implementations, the fracturing fluid in the slurry can be a thicker or more viscous fracturing fluid having a viscosity greater than 100 cP. In particular implementations, the frac rates or parameters adjusted may include at least two variables which are fracturing-fluid pump(s) 910 rate and proppant (for example, sand) concentration in the fracturing fluid 908. Frac operations can be manual and guided with controllers and software.

The control system 914 may direct operation of the hydraulic fracturing system including the addition of the additive 909 to the fracturing fluid 908 in particular. The control system 914 may have one or more controllers. The control system 914 may include a hardware processor 916 and memory 918 storing code 920 (for example, logic and instructions) executed by the processor to direct operations such as specifying the set point of the control component 911 to maintain or adjust a property of the jarosite formed. The control system 914 responsive, for example, to the timing of the hydraulic fracturing may send an alert to change the composition of the additive 909 to affect a property of the jarosite formed. In some implementations, the control system 914 may direct an additive system (not shown) to alter the composition of the additive 909.

The processor 916 may be one or more processors, and may have one or more cores. The hardware processor(s) 916 may include a microprocessor, a central processing unit (CPU), a graphics processing unit (GPU), or other circuitry. The memory 918 may include volatile memory (for example, cache and random access memory or RAM), nonvolatile memory (for example, hard drive, solid-state drive, and read-only memory or ROM), and firmware. The control system 914 may include a field computer, remote computer, laptop computer, a desktop computer, a programmable logic controller (PLC), distributed control system (DCS), and control card or circuitry. The control system 914 or associated computing system may direct the in situ formation of jarosite or proppant and is therefore unconventional.

The control component 911 (for example, as directed by the control system 914) may adjust the timing of the injected fracturing treatment fluid 908 as having the additive 909 to generate a jarosite matrix having a "spatial gradient" that provides a variance of permeability between near wellbore to far-field fracturing. The timing or concentration of the additive 909 in the fracturing fluid 908 may be adjusted for growing jarosite in-situ of varying heights and geometries, for example, at larger mesh in near wellbore (jarosite>150 μm) to smaller mesh in far-field (jarosite<150 μm) fracturing applications. In a particular implementation, the control system 914 may direct the control component 911 to alter flow rate and thus adjusting the composition of the treatment fluid 908 to generate a jarosite matrix of varying packing density to provide a varying permeability from near wellbore to far-field fracturing application.

An embodiment is a hydraulic fracturing system including a vessel holding a fracturing fluid. The system includes a control component (for example, control valve or metering pump) to modulate an addition rate of an additive (for example, an oxidizer or iron ions) to the fracturing fluid in the vessel. For some implementations with the frac fluid prepared from seawater, an adequate amount of sulfate ions may already exist in the frac fluid and, therefore, iron ions are incorporated into the frac fluid as a component of aforementioned additive. In other examples, sulfate ions may be incorporated as a component of the additive. In yet other examples, an oxidizer is incorporated and which may be, for instance, bromate or chlorate. The system includes a pump (or plurality of pumps) to provide the fracturing fluid from the vessel through a wellbore into a geological formation to hydraulically fracture the geological formation to generate fractures in rock in the geological formation. The pump may be, for example, a positive displacement pump. A control system adjusts a set point of the control component to change a concentration of the additive in the fracturing fluid in response to a timing of the hydraulic fracturing and to alter a property of a jarosite matrix formed in the fractures via the fracturing fluid. In one implementation, the property adjusted is packing density of the jarosite matrix.

Figure 10:
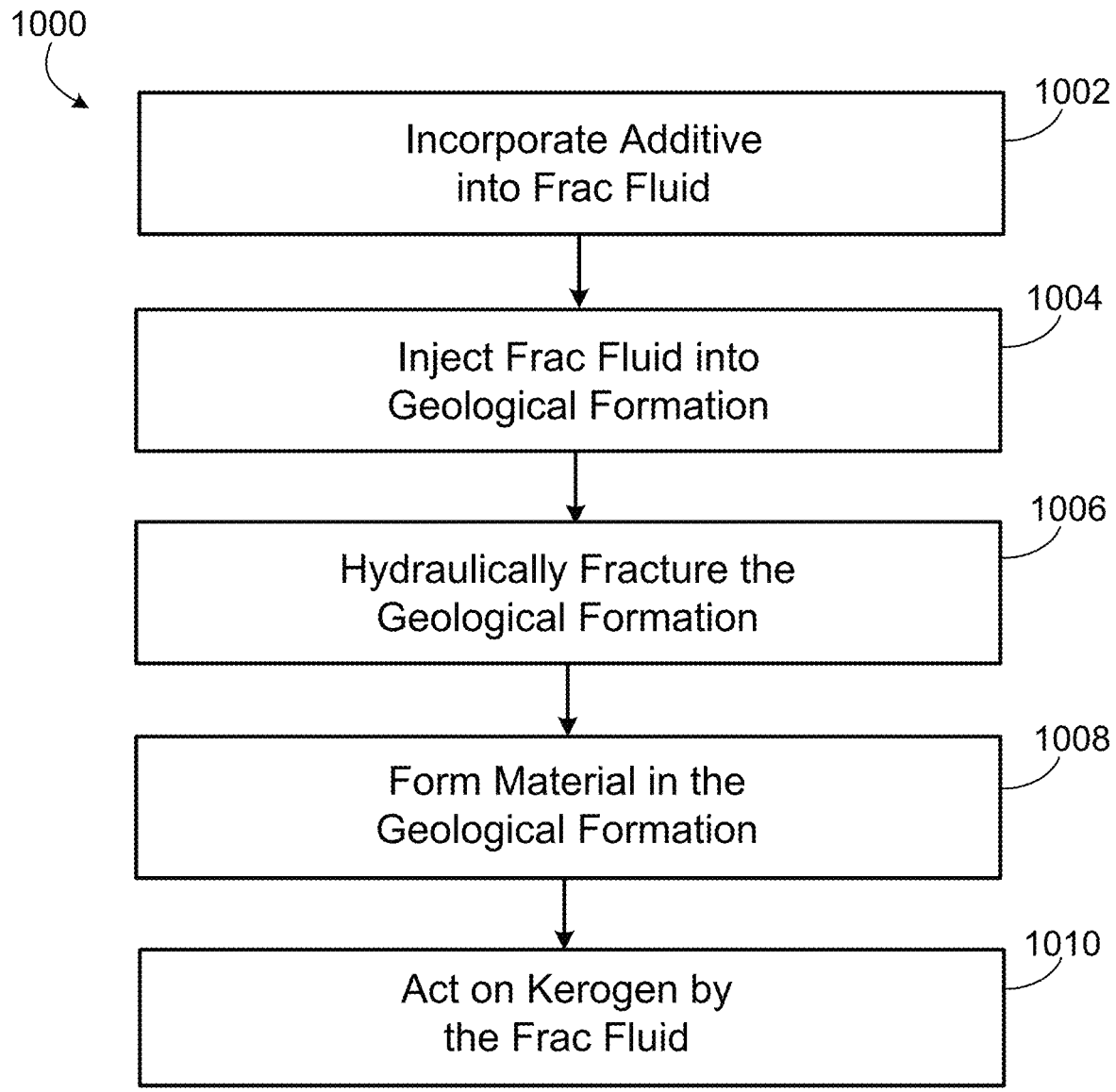
FIG. 10 is a block flow diagram of a method of forming material (for example, jarosite, proppant) in a geological formation.

FIG. 10 is a method 1000 of forming material (for example, jarosite) in a geological formation. The method may including forming the material as proppant in situ in the geological formation, such as in fractures in rock in the geological formation. The proppant may aid in maintaining fractures open in the geological formation.

At block 1002, the method includes incorporating an additive (for example, additive 909) in frac fluid for forming the material in the geological formation. As discussed, the additive may include an oxidizer, sulfate source, $Fe^{3+}$ ions, or $SO_4^{2-}$ ions, or any combinations thereof. The timing or amount of additive may be adjusted to alter properties of the jarosite or proppant formed in situ in the geological formation.

At block 1004, the method includes injecting frac fluid (which may have the additive) through a wellbore into the geological formation. For example, the frac fluid may be pumped into the wellbore. For the wellbore as a cemented cased wellbore, perforations through the casing and cement may facilitate introduction or injection of the frac fluid from the wellbore into the geological formation.

At block 1006, the method includes hydraulically fracturing the geological formation with the frac fluid. The fracturing may be to increase the subsequent production of hydrocarbon (for example, crude oil and natural gas) from the geological formation. The fracturing may include primary fractures and smaller secondary fractures. The fractures may include microfractures. The hydraulic fracturing may include the introduction of traditional proppant.

At block 1008, the method includes forming material or mineral (for example, jarosite, proppant, or jarosite proppant) in the geological formation via the frac fluid. As discussed, the frac fluid may form jarosite proppant or a jarosite layer in fractures in the geological formation. The jarosite may precipitate from the frac fluid onto rock in the geological formation, such as onto fracture faces.

In certain embodiments, the frac fluid has an oxidizer (the aforementioned additive) to oxidize pyrite in the geological formation to form the jarosite. The frac fluid may also include a sulfate source associated with the oxidizer. The oxidizer (and sulfate source) oxidize the pyrite to generate $Fe^{3+}$ ions and $SO_4^{2-}$ ions. The $Fe^{3+}$ ions and $SO_4^{2-}$ ions may react and precipitate as jarosite.

In other embodiments, the frac fluid has $Fe^{3+}$ ions and $SO_4^{2-}$ ions incorporated into the frac fluid at the Earth surface to form the jarosite in situ in the geological formation such as in the fractures. For some implementations with the frac fluid prepared from seawater, an adequate amount of $SO_4^{2-}$ ions may already exist in the frac fluid and therefore, $Fe^{3+}$ ions are incorporated into the frac fluid as the aforementioned additive.

At block 1010, the method includes acting on kerogen by the frac fluid if kerogen is present in the geological formation. For implementations with the frac fluid including an oxidizer, the frac fluid may degrade and remove kerogen from rock in the geological formation. Thus, in those instances, jarosite may form in voids in the rock provided by the removal of kerogen.

An embodiment is a method of forming proppant in situ in a geological formation, including injecting a frac fluid through a wellbore into the geological formation, and hydraulically fracturing the geological formation with the frac fluid to generate fractures in the geological formation. The method includes forming, via the frac fluid and hydrothermal synthesis, the proppant in situ in the fractures in the geological formation. The proppant may be formed from rock in the geological formation or from ions in the frac fluid, or a combination thereof. The forming may involve forming the proppant from pyrite in the geological formation. The frac fluid may include an oxidizer, and where the forming of the proppant (for example, jarosite) involves oxidizing the pyrite via the frac fluid to give iron ions and sulfate ions in the frac fluid and to grow the proppant on rock in the geological formation. The forming of the proppant may involve precipitating the proppant from the frac fluid as crystallites such that the proppant is deposited on faces of the fractures. The proppant may be formed from iron ions and sulfate ions in the frac fluid. The proppant may be a jarosite mineral.

Another embodiment is a method of forming proppant in situ in a geological formation, including pumping a fracturing fluid through a wellbore into the geological formation, and hydraulically fracturing the geological formation with the frac fluid to generate fractures in the geological formation. The method includes precipitating the proppant from the fracturing fluid on rock in the geological formation. In some implementations, the fracturing fluid includes $Fe^{3+}$ ions and $SO_4^{2-}$ ions. In examples, the precipitating of the proppant on the rock comprises depositing the proppant as crystallites on faces of the fractures. The method may include oxidizing the rock in the geological formation via the fracturing fluid having an oxidizer. The rock may include pyrite and where the proppant formed includes or is a jarosite group mineral.

Yet another embodiment is a method of forming a mineral in a geological formation, including injecting a frac fluid through a wellbore into the geological formation and forming, via the frac fluid, the mineral on rock in the geological formation. The rock may include pyrite. The rock can include pyrite, siderite, pyrrhotite, chlorite group minerals, chamosite, illite, marcasite, mica, ankerite, or other minerals, or any combinations thereof. The injecting of the frac fluid may involve pumping the frac fluid from the Earth surface. The forming of the mineral may include precipitating the mineral on fracture faces in the geological formation as a proppant (for example, having a particle size less than 150 μm). The mineral may include jarosite, hematite, lepidocrocite, or ferrihydrite, or any combinations thereof. The mineral formed may be jarosite. The jarosite formed may be a jarosite matrix. The jarosite may include a jarosite solid solution series. The jarosite may include natrojarosite, hydroniumjarosite, or ammoniojarosite, or any combinations thereof. The method may include hydraulically fracturing the geological formation with the frac fluid to generate fractures in the geological formation. The forming of the jarosite on the rock includes forming the jarosite in the fractures. The jarosite formed in the fractures may include jarosite particles (for example, having a particle size of less than 150 μm) and with the jarosite particles acting as a proppant in the fractures. The forming of the jarosite may include forming, via the frac fluid, the jarosite as a proppant in a fracture tip portion of a hydraulic fracture in the geological formation. Moreover, the forming of the jarosite may involve oxidizing pyrite in the geological formation with the frac fluid. The oxidizing of the pyrite may include oxidizing the pyrite to $Fe^{3+}$ and $SO_4^{2-}$. The pyrite is generally an iron sulfide mineral $FeS_2$. The oxidizing of the pyrite can include converting $Fe^{2+}$ in the pyrite to $Fe^{3+}$ and converting sulfide $S_2^{2-}$ in the pyrite to $2SO_4^{2-}$. The frac fluid may have an oxidizer including bromate ions or chromate ions, or a combination thereof. The frac fluid may have an oxidizer including an alkali salt of bromate, an alkali salt of chlorate, an alkali earth metal salt of bromate, or an alkali earth metal salt of chlorate, or any combinations thereof. The frac fluid may have an oxidizer and a sulfate source including sulfate ions $SO_4^{2-}$ or persulfate ions $S_2O_8^{2-}$, or a combination thereof. The frac fluid may have an oxidizer and a sulfate source. The sulfate source can include a sulfate salt of sodium, potassium, or ammonium, or a persulfate salt of sodium, potassium, or ammonium, or any combinations thereof. The forming of the jarosite may involve reacting $Fe^{3+}$ and $SO_4^{2-}$ and where a temperature of the geological formation provides a hydrothermal condition for the reacting. The forming of the jarosite may include hydrothermal synthesis of the jarosite and precipitation of the jarosite on the rock. The precipitation on the rock may include precipitation of the jarosite on fracture faces as a microproppant or nanoproppant, or both. The method may include the frac fluid degrading and removing kerogen from the rock. The removal of the kerogen may create voids in the rock. The forming of the jarosite may include growing jarosite in the voids. The forming of the jarosite may include depositing jarosite on a surface of the rock outside of the voids.

Yet another embodiment is a method of forming a jarosite group mineral in a geological formation, including pumping a fracing fluid through a wellbore into the geological formation and hydraulically fracturing the geological formation with the fracing fluid to generate fractures in the geological formation. The fracing fluid may include seawater. The method includes synthesizing the jarosite group mineral from iron ions and sulfate ions in the fracing fluid via temperature of the geological formation. The method includes precipitating the jarosite group mineral to deposit the jarosite group mineral as a crystallite on faces of the fractures. The precipitating may include forming the jarosite group mineral as a proppant in the fractures. The precipitating may include forming a layer of the jarosite group mineral on the faces of the fractures. In one implementation, the layer has a thickness of less than 30 μm. The method may include oxidizing pyrite in the geological formation via the fracing fluid having an oxidizer to give respective threshold concentrations of the iron ions and sulfate ions in the fracing fluid for the synthesizing (for example, involving hydrothermal synthesis) of the jarosite group mineral. The method may include incorporating the iron ions and the sulfate ions in the fracing fluid at the Earth surface outside of the wellbore.

A number of implementations have been described. Nevertheless, it will be understood that various modifications may be made without departing from the spirit and scope of the disclosure.

What is claimed is:

1. A method of forming proppant in situ in fractures in a geological formation, comprising:
   providing a frac fluid through a wellbore into the geological formation;
   hydraulically fracturing the geological formation with the frac fluid to generate the fractures in the geological formation; and
   forming the proppant in situ in the fractures by forming mineral in the fractures via hydrothermal synthesis of the mineral from ions in the frac fluid, wherein the proppant is the mineral.

2. The method of claim 1, wherein the ions comprise iron $Fe^{3+}$ ions.

3. The method of claim 2, wherein the ions comprise sulfate $SO_4^{2-}$ ions.

4. The method of claim 1, wherein the ions comprise ions received into the frac fluid by oxidizing, via the frac fluid, rock in the geological formation.

5. The method of claim 4, wherein the ions received into the frac fluid comprise iron $Fe^{3+}$ ions by conversion of iron $Fe^{2+}$ in the rock via the oxidizing.

6. The method of claim 5, wherein the ions received into the frac fluid comprise sulfate $SO_4^{2-}$ ions by conversion of sulfide $SO_2^{2-}$ in the rock via the oxidizing.

7. The method of claim 4, wherein the rock comprises pyrite, siderite, pyrrhotite, chlorite group minerals, chamosite, illite, marcasite, mica, or ankerite, or any combinations thereof.

8. The method of claim 4, wherein the rock comprises pyrite.

9. The method of claim 1, wherein the ions comprise ions added to the frac fluid at Earth surface.

10. The method of claim 9, wherein the ions added to the frac fluid comprises iron $Fe^{3+}$ ions.

11. The method of claim 9, wherein the ions added to the frac fluid comprises sulfate $SO_4^{2-}$ ions.

12. The method of claim 1, wherein the ions comprise ions from a sulfate source added to the frac fluid at Earth surface or from oxidation of the sulfate source added to the frac fluid at the Earth surface, or a combination thereof.

13. The method of claim 1, wherein the ions comprise sulfate $SO_4^{2-}$ ions from seawater incorporated into the frac fluid.

14. The method of claim 1, wherein forming the mineral comprises precipitating the mineral.

15. The method of claim 1, comprising adjusting composition of the frac fluid in real time to form the mineral as a mineral matrix having a packing density that varies from near wellbore to far field.

16. The method of claim 1, wherein the frac fluid degrades and removes kerogen from rock in the geological formation, wherein removal of the kerogen creates voids in the rock, and wherein forming the mineral in the fractures comprises forming the mineral in one of the voids or on a surface of the rock outside of the voids, or a combination thereof.

17. A method of forming proppant in situ in a geological formation, comprising:
pumping a fracturing fluid through a wellbore into the geological formation;
hydraulically fracturing the geological formation with the fracturing fluid to generate fractures in the geological formation; and
forming the proppant in situ in the fractures by forming mineral in the fractures via hydrothermal synthesis of the mineral from ions in the fracturing fluid and precipitating the mineral from the fracturing fluid onto rock in the fractures, wherein the proppant is the mineral.

18. The method of claim 17, wherein the ions comprises iron ions and sulfate ions.

19. The method of claim 17, wherein the ions comprises iron $Fe^{3+}$ ions.

20. The method of claim 17, wherein the ions comprise sulfate $SO_4^{2-}$ ions.

21. The method of claim 17, wherein the precipitating the mineral onto the rock comprises depositing the mineral as crystallites on faces of the fractures.

22. The method of claim 17, comprising adjusting composition of the fracturing fluid in real time to form the mineral as a mineral matrix comprising a packing density that varies from near wellbore to far field.

23. The method of claim 17, wherein forming the mineral comprises oxidizing the rock with the fracturing fluid, wherein the fracturing fluid comprises an oxidizer.

24. The method of claim 23, wherein the fracturing fluid degrades and removes kerogen from the rock, wherein removal of the kerogen creates voids in the rock, and wherein forming the mineral in the fractures comprises forming the mineral in one of the voids or on a surface of the rock outside of the voids, or a combination thereof.

25. The method of claim 23, wherein the rock comprises pyrite, and wherein the mineral comprises a jarosite group mineral.

26. The method of claim 25, wherein the pyrite comprises an iron sulfide mineral $FeS_2$, and wherein oxidizing the pyrite comprises converting $Fe^{2+}$ in the pyrite to $Fe^{3+}$ and converting sulfide $S_2^{2-}$ in the pyrite to $SO_4^{2-}$.

27. The method of claim 18, wherein the mineral comprises jarosite, hematite, lepidocrocite, or ferrihydrite, or any combinations thereof.

28. The method of claim 18, wherein the mineral comprises a jarosite.

29. The method of claim 28, wherein the jarosite comprises jarosite, natrojarosite, hydroniumjarosite, or ammoniojarosite, or any combinations thereof.

30. A method of forming proppant in situ in fractures in a geological formation, comprising:
injecting a fracturing fluid through a wellbore into the geological formation;
hydraulically fracturing the geological formation with the fracturing fluid to generate the fractures in the geological formation;
synthesizing mineral from ions in the fracturing fluid via temperature of the geological formation; and
precipitating the mineral to deposit the mineral as a crystallite on faces of the fractures, wherein the proppant comprises the mineral.

31. The method of claim 30, wherein the synthesizing comprises hydrothermal synthesis, and wherein the precipitating and the synthesizing occur contemporaneously.

32. The method of claim 30, comprising adjusting composition of the fracturing fluid in real time to form the mineral in the fractures as a mineral matrix comprising a permeability that varies from near wellbore to far field.

33. The method of claim 30, wherein the fracturing fluid comprises an oxidizer, wherein the fracturing fluid degrades and removes kerogen from rock in the geological formation, wherein removal of the kerogen creates voids in the rock, and wherein forming the mineral in the fractures comprises forming the mineral in a void of the voids or on a surface of the rock outside of the voids, or a combination thereof.

34. A hydraulic fracturing system comprising:
a vessel holding a fracturing fluid;
a control component to modulate an addition rate of an additive to the fracturing fluid;
a pump to provide the fracturing fluid from the vessel through a wellbore into a geological formation to hydraulically fracture the geological formation to generate fractures in the geological formation; and
a control system to adjust a set point of the control component to change a concentration of the additive in the fracturing fluid to alter a property of a mineral formed in the fractures via the fracturing fluid.

35. The system of claim 34, wherein the mineral comprises a mineral matrix, and wherein the property comprises packing density of the mineral matrix.

36. The system of claim 34, wherein the control component comprises a control valve or a metering pump, and wherein the additive comprises an oxidizer or iron ions, or a combination thereof.

37. The system of claim 34, wherein the additive comprises an oxidizer, and wherein the control component to modulate the addition rate of the oxidizer to degrade and remove kerogen from rock in the geological formation via the fracturing fluid and form the mineral in voids in the rock or on a surface of the rock outside of the voids, or a combination thereof.

* * * * *